(12) United States Patent
Wu et al.

(10) Patent No.: US 11,940,583 B2
(45) Date of Patent: Mar. 26, 2024

(54) GAUGE LENGTH EFFECT AND GAUGE LENGTH CONVERSION

(71) Applicant: Halliburton Energy Services, Inc., Houston, TX (US)

(72) Inventors: Xiang Wu, Singapore (SB); Mark Elliott Willis, Katy, TX (US); David Andrew Barfoot, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 373 days.

(21) Appl. No.: 17/534,630

(22) Filed: Nov. 24, 2021

(65) Prior Publication Data

US 2022/0082720 A1    Mar. 17, 2022

Related U.S. Application Data

(62) Division of application No. 15/765,359, filed as application No. PCT/US2017/013958 on Jan. 18, 2017, now Pat. No. 11,215,727.

(51) Int. Cl.
    *G01V 1/48*       (2006.01)
    *E21B 47/135*     (2012.01)
    (Continued)

(52) U.S. Cl.
    CPC ............. *G01V 1/42* (2013.01); *E21B 47/135* (2020.05); *G01H 9/004* (2013.01); *G01V 1/201* (2013.01);
    (Continued)

(58) Field of Classification Search
    CPC .......... G01V 1/42; G01V 1/201; G01V 1/226; G01V 1/48; G01V 1/52; G01V 2210/121;
    (Continued)

(56) References Cited

U.S. PATENT DOCUMENTS 6,314,056 B1    11/2001    Bunn et al.
6,724,319 B1    4/2004     Knaack et al.
(Continued)

FOREIGN PATENT DOCUMENTS

WO    WO-2015168538 A1 *   11/2015   ........... E21B 47/102
WO    WO 2016/112147 A1    7/2016
WO    WO-2016112147 A1 *   7/2016    ............. G01H 9/004

OTHER PUBLICATIONS

International Search Report and The Written Opinion of the International Search Authority, or the Declaration, dated Oct. 18, 2017, PCT/US2017/013958, 17 pages, ISA/KR.

*Primary Examiner* — Krystine E Breier
(74) *Attorney, Agent, or Firm* — John Wustenberg; C. Tumey Law Group PLLC

(57) ABSTRACT

Various embodiments include apparatus and methods implemented to take into consideration gauge length in optical measurements. In an embodiment, systems and methods are implemented to interrogate an optical fiber disposed in a wellbore, where the optical fiber is subjected to seismic waves, and to generate a seismic wavefield free of gauge length effect and/or to generate a prediction of a seismic wavefield of arbitrary gauge length, based on attenuation factors of a plurality of wavefields acquired from interrogating the optical fiber. In an embodiment, systems and methods are implemented to interrogate an optical fiber disposed in a wellbore, where the optical fiber is subjected to seismic waves, and to convert a seismic wavefield associated with a first gauge length to a seismic wavefield associated with a different gauge length that is a multiple of the first gauge length. Additional apparatus, systems, and methods are disclosed.

9 Claims, 26 Drawing Sheets

(51) Int. Cl.
*G01H 9/00* (2006.01)
*G01V 1/20* (2006.01)
*G01V 1/22* (2006.01)
*G01V 1/42* (2006.01)
*G01V 1/52* (2006.01)

(52) U.S. Cl.
CPC .............. *G01V 1/226* (2013.01); *G01V 1/48* (2013.01); *G01V 1/52* (2013.01); *G01V 2210/121* (2013.01); *G01V 2210/1234* (2013.01); *G01V 2210/1429* (2013.01); *G01V 2210/161* (2013.01); *G01V 2210/324* (2013.01)

(58) Field of Classification Search
CPC ... G01V 2210/1234; G01V 2210/1429; G01V 2210/161; G01V 2210/324; E21B 47/135; G01H 9/004
See application file for complete search history.

(56) References Cited

U.S. PATENT DOCUMENTS

| | | |
|---|---|---|
| 8,755,643 B2 | 6/2014 | Nash et al. |
| 2011/0088462 A1 | 4/2011 | Samson et al. |
| 2011/0320147 A1 | 12/2011 | Brady et al. |
| 2012/0257475 A1 | 10/2012 | Hernandez et al. |
| 2013/0100788 A1 | 4/2013 | Freund et al. |
| 2014/0064028 A1 | 3/2014 | Coates et al. |
| 2014/0105533 A1 | 4/2014 | Jaaskelainen et al. |
| 2014/0150523 A1 | 6/2014 | Stokely et al. |
| 2014/0203946 A1 | 7/2014 | Skinner et al. |
| 2014/0204712 A1 | 7/2014 | Skinner et al. |
| 2016/0146661 A1 | 5/2016 | Martin et al. |
| 2016/0245077 A1 | 8/2016 | Willis et al. |
| 2017/0075029 A1* | 3/2017 | Cuny .................. G01V 1/52 |

* cited by examiner

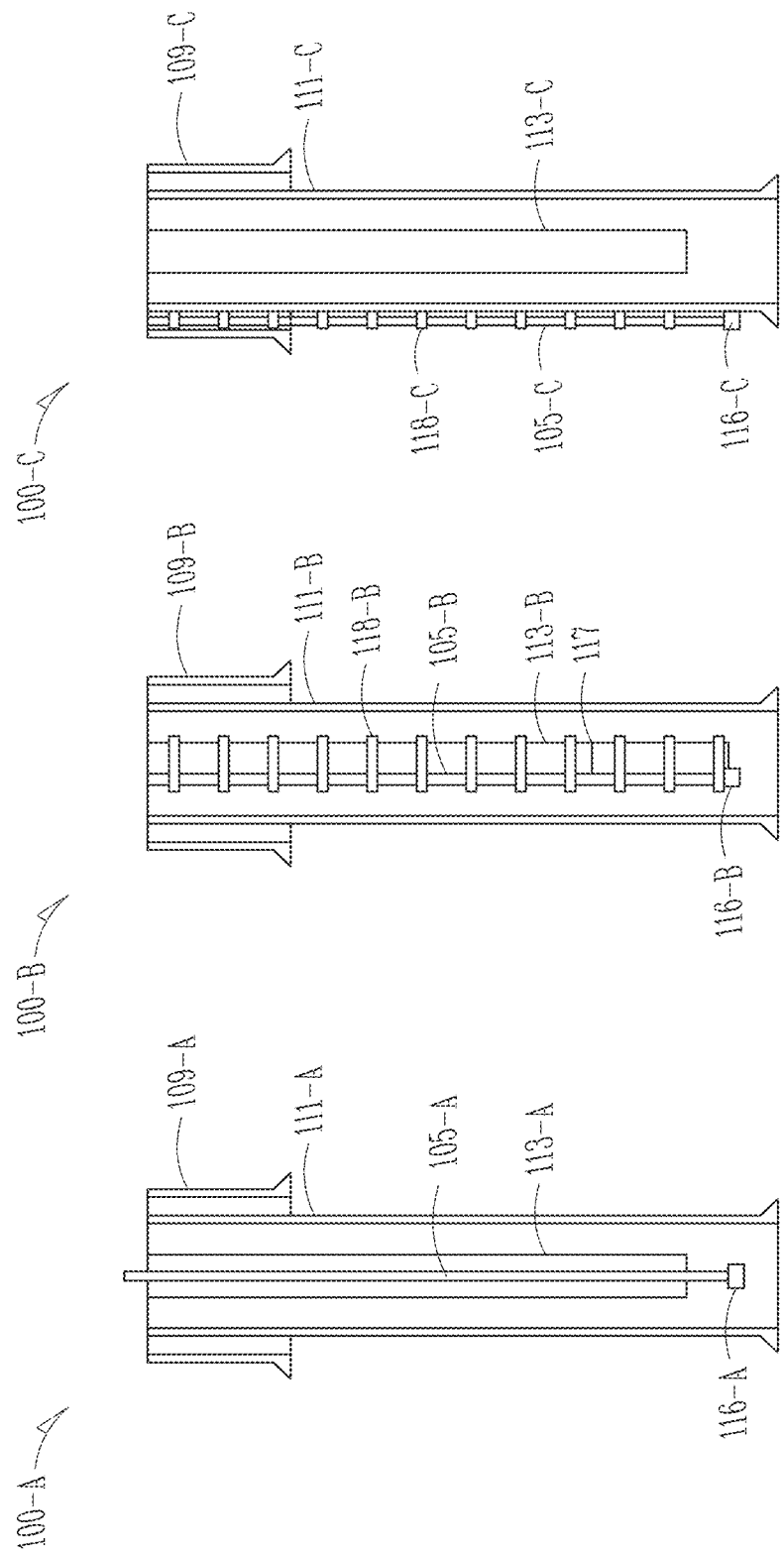

GAUGE LENGTH EFFECT AND GAUGE LENGTH CONVERSION

CROSS-REFERENCE TO RELATED APPLICATIONS

The present application is a Divisional of U.S. patent application Ser. No. 15/765,359, filed on Apr. 2, 2018, which is a U.S. National Stage patent application of International Patent Application No. PCT/US2017/013958, filed on Jan. 18, 2017, the benefit of each of which is claimed and the entire disclosure of each of which is incorporated herein by reference in its entirety.

TECHNICAL FIELD

The present invention relates generally to apparatus and methods with respect to measurements related to oil and gas exploration.

BACKGROUND

Distributed acoustic sensing (DAS) technology is being implemented for vertical seismic profiling (VSP). Such technology is being developed for permanently installed reservoir monitoring, as well as for temporary deployment in boreholes. Conventional VSP technology has used a seismic source at the surface near a well and geophones within the borehole to make seismic measurements, which can be correlated with surface seismic data. In the conventional VSP approach, reflected energy contained in a recorded trace at each geophone position can be used to obtain an image. DAS can utilize a fiber optic cable deployed in a borehole that can be remotely interrogated with one or multiple surface-based lasers. Rayleigh scattering from random heterogeneities in the optical fiber of the cable is the primary mechanism of back propagation of laser beams for interrogation, where the optical fiber is an optical waveguide. Phase difference of the demodulated back-scattered light is introduced when the optical fiber is deformed by impinging seismic waves. Processing the time-of-flight of laser pulses enables the optical fiber to attain fine channel spacing of typically 1 meter, which is equivalent to a VSP receiver level. Thus, the density of samples significantly increases compared to that of conventional VSP, with data acquisition rates often as high as 20 kHz for simplified acquisition hardware. However, DAS is very sensitive to a variety of environmental and survey parameters. Such factors collectively degrade signal quality, which is usually quantified by signal-to-noise ratio (SNR). To extract geophysical and geological information from the densely acquired data stream, a downsampling technique is needed to firstly improve SNR, and secondly maintain a reasonably high resolution and broad spectrum of DAS VSP data.

BRIEF DESCRIPTION OF THE DRAWINGS

FIGS. 1A-1C are schematic representations of examples of fiber optic-based distributed acoustic sensing deployed in a borehole, in accordance with various embodiments.

FIG. 7 is a plot of amplitude versus wavenumber for the set of waveforms corresponding to FIG. 6 showing the corresponding spectra of the inverted wavelet, in accordance with various embodiments.

FIG. 8 is a plot of amplitude versus depth for a set of spatial waveforms of different gauge lengths, in accordance with various embodiments.

FIG. 9 is a plot of amplitude versus wavenumber for the set of waveforms corresponding to FIG. 8 showing the corresponding wavenumber spectra, in accordance with various embodiments.

DETAILED DESCRIPTION

Figure 2A:
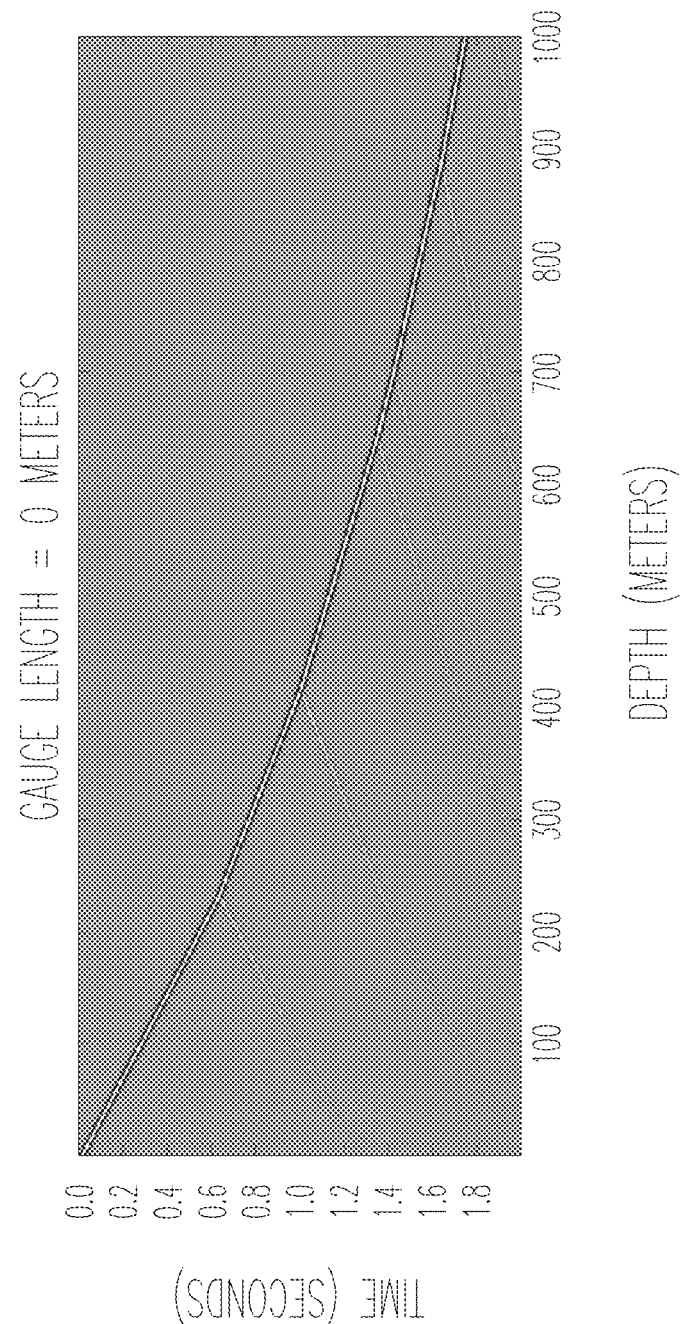
FIGS. 2A-2C are synthetic examples of distributed acoustic sensing vertical seismic profiling wavefields acquired by using different gauge lengths over time and depth, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, electrical, and mechanical changes may be made to these embodiments. The various embodiments are not necessarily mutually exclusive, as some embodiments can be combined with one or more other embodiments to form new embodiments. The following detailed description is, therefore, not to be taken in a limiting sense.

Conventional VSP surveys use hydrophones or geophones deployed in a borehole, sensing, by detecting and recording, acoustic wavefields generated from near surface sources. The surface sources may include, for example, vibrators, explosives, air guns, and other similar sources. While hydrophones and geophones provide one-dimensional (1D) sensitivity, they can be configured in pairs or triads for two-dimensional (2D) and three-dimensional (3D) sensitivity. DAS VSP surveys replace the hydrophones or geophones with a fiber optic cable that can be remotely interrogated with a surface-based laser. Rayleigh scattering from random heterogeneities in the optical fiber (optical waveguide) occurs when the optical fiber (optical waveguide) is deformed by mechanical/seismic waves induced by vibrations. Time-of-flight of laser pulses enable the time resolution of raw recorded data stream as high as 20 kHz. The spatial resolution, confined by pulse width of lasers and gauge length, can be attained at a channel spacing of typically 1 meter, equivalent to a VSP receiver level. The gauge length is a base length for measurement.

During hydrocarbon recovery operations, including well drilling, it is common to use DAS systems to collect VSP data along the length of a wellbore. FIGS. 1A-1C are schematic representations of examples of fiber optic-based DAS deployed in a borehole. FIG. 1A shows a wireline deployment 100-A, which is a retrievable deployment. For wireline deployment, the sensor cable is actively deployed and retrieved, which deployment and retrieval may interrupt production while minimal interruption is preferred from an operational perspective. The wireline deployment 100-A can include a fiber optic cable 105-A within a tubing 113-A that can be within a production casing 111-A that can be within a surface casing 109-A. A bottom hole gauge carrier with a pressure and/or temperature (PT) gauge 116-A can be coupled to an end of the fiber optic cable 105-A.

FIG. 1B shows a tubing deployment 100-B, which is a permanent deployment. The tubing deployment 100-B can include a fiber optic cable 105-B coupled to the outside of a tubing 113-B. A set of cross-coupling protectors 118-B can be used in coupling the fiber optic cable 105-B to the outside of the tubing 113-B. The set of cross-coupling protectors 118-B may include one of the cross-coupling protectors at every other joint of the tubing 113-B. The tubing 113-B can be within a production casing 111-B that can be within a surface casing 109-B. A tubing tail of the tubing 113-B can be extended below a bottom perforation location 117 in the borehole. A bottom hole gauge carrier with a pressure and/or temperature (PT) gauge 116-B can be coupled to an end of the fiber optic cable 105-B.

FIG. 1C shows a casing deployment 100-C, which is a permanent deployment. The casing deployment 100-C can include a fiber optic cable 105-C coupled to the outside of a production casing 111-C. A set of cross-coupling protectors 118-C can be used in coupling the fiber optic cable 105-C to the outside of the production casing 111-C. The set of cross-coupling protectors 118-C may include one of the cross-coupling protectors at every other joint of the production casing 111-C. A tubing 113-C can be disposed within the production casing 111-C that can be within a surface casing 109-C. A bottom hole gauge carrier with a pressure and/or temperature (PT) gauge 116-C can be coupled to an end of the fiber optic cable 105-C.

A laser generator with a certain frequency or multiple laser generators with preset frequencies intermittently emit light pulses, and an interrogator together with the laser generators record the back-scattered light. Gauge length is applied during acquisition in a contemporary DAS system. In current scheme of DAS acquisition, the recorded DAS VSP data for each sweep is encoded by predetermined gauge lengths. The semi-empirical choices of gauge length aim to provide possible DAS VSP data with optimal quality, in terms of SNR, bandwidth, etc. For instance, 10 meters and 20 meters are two frequent choices of gauge length. Gauge lengths of 5 meters or 40 meters were adopted in some field surveys and tests as well. Nevertheless, there is no clear guideline why a certain gauge length is picked in order to obtain quality DAS VSP data until it is acquired, processed, and visualized.

Figure 2B:
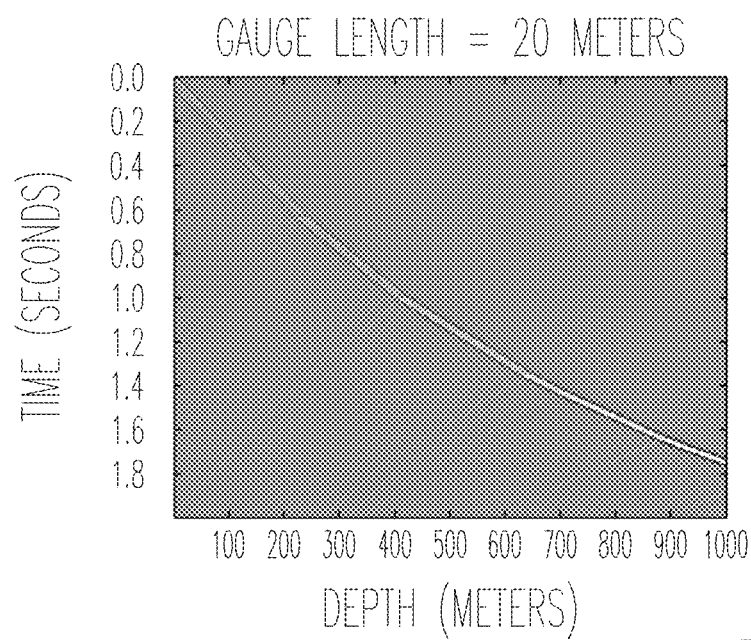
Figure 2C:
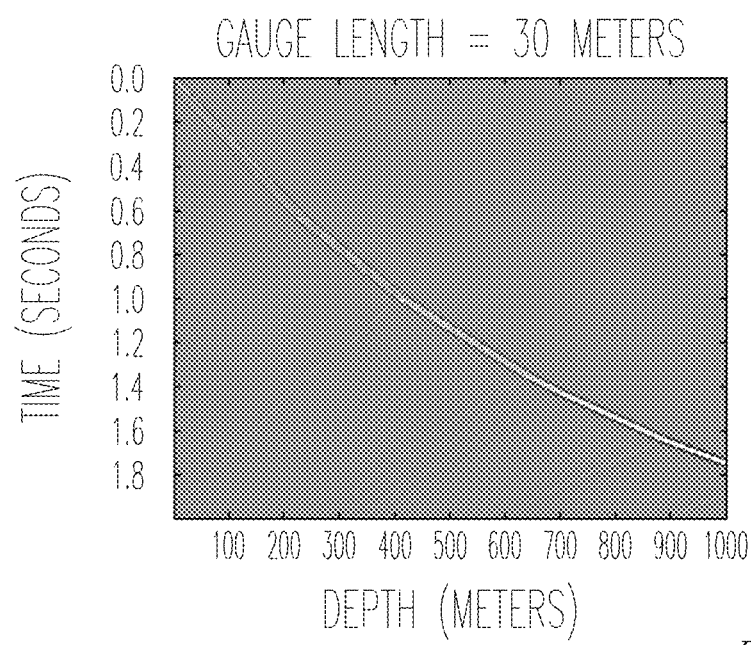

FIGS. 2A-2C are synthetic examples of DAS VSP wavefields acquired by using different gauge lengths over time and depth. FIG. 2A is a representation of gauge length-free wavefields. FIG. 2B is a representation of wavefields of 20-meter gauge length. FIG. 2C is a representation of wavefields of 30-meter gauge length. FIGS. 2A-2C are normalized for each trace, displayed with the same gain. A trace is a recording of the earth's response to seismic energy passing from a source through subsurface layers to a receiver, which can include reflective paths. The VSP diagrams discussed herein are normalized by each trace and displayed with the same gain. The gain can be as shown as in FIG. 2 unless otherwise stated. The displayed VSP wavefields of FIGS. 2A-2C are provide by the same processing flows, which includes weighted stacking, cross-correlation with source sweep trace and common-mode noise removal. This process generally diminishes the faded traces, collapses the prolonged original VSP records, and removes the horizontal stripes that severely interfere with geophysical signals. No amplitude alteration of the geophysical signals was performed in this processing flow.

Comparing the DAS VSP wavefields of gauge length of 20 meters and 30 meters, one can see that incoherent noise ramps up on the right section of the wavefields of 20-meter gauge length, while the events in the bottom right of the wavefields of 30-meter gauge length, including the first break arrivals, are less contaminated by such incoherent noise. An approach to restore DAS VSP data from gauge length effect by inverting the gauge length operator has been proposed. A data driven approach was proposed recently to try to find an optimum for gauge length for DAS VSP acquisition; however, it is more semi-empirical and needs the information of side-lobes, which might not be general and universal to adapt to complicated situations.

A DAS VSP seismic image is normally composed of n recorded traces and m time samples per trace. Different from conventional measurements, DAS measures strain (strain rate) of an optical fiber in response to impinging seismic waves. Strain is defined for certain length of fiber, thus it is different from a point measurement in nature. Such preset length is referred to as gauge length. It basically performs a spatial stacking to the raw continuous data stream (up to 10 kHz), or a boxcar filtering. Receiver levels are then defined at the center of the fiber section spanned gauge length, with designated channel spacing. The setup of the DAS system is illustrated in FIG. 3 where the above definitions are graphically annotated.

Figure 3:
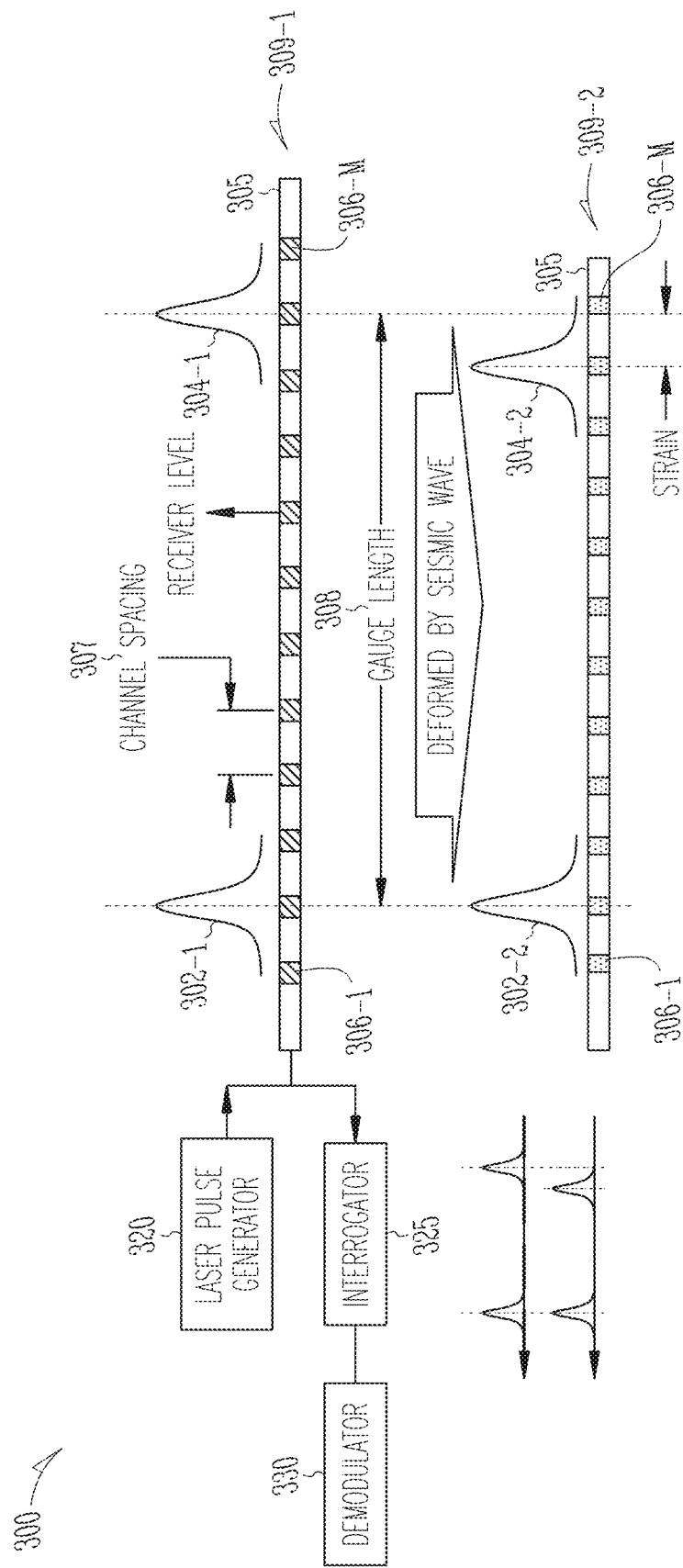
FIG. 3 is a schematic illustration of an example distributed acoustic sensing acquisition system, in accordance with various embodiments.

FIG. 3 is a schematic illustration of an example DAS acquisition system 300. The DAS acquisition system 300 includes an optical fiber 305 with a series of receiver levels 306-1 . . . 306-M of which the adjacent spacing is referred to as channel spacing 307. The two waveforms 302-1 and 304-1 are laser pulses separated by the spacing of gauge length 308. Arrangement 309-1 is the optical fiber 305 prior to being deformed by impinging seismic waves, while arrangement 309-2 is the optical fiber 305 with the receiver levels 306-1 . . . 306-M and waveforms 302-2 and 304-2 when the optical fiber 305 is deformed by impinging seismic waves. The DAS acquisition system 300 includes a laser pulse generator 320 that emits laser pulses, and an interrogator 325 that receives the pulse trains. A demodulator 330 can be used for splitting the beam and computing the phase difference between laser pulses. As shown in FIG. 3, the optical fiber 305 is subjected to a pre-determined gauge length l during the acquisition or in the preprocessing flow. DAS VSP wavefields can be herein denoted as $D_l(t, x) \in \mathbb{R}^{m \times n}$, where t and x are temporal and spatial variable, respectively.

In various embodiments, apparatus and methods are implemented to process and control VSP surveys for formation evaluation and monitoring. Such methods can be directed to inverting wavefields that are free of gauge length effects and to predicting wavefields of arbitrary length from the VSP data acquired using fiber optic-based DAS. The acquired DAS VSP data can improve the signal quality, as well as extend the bandwidth of the recorded data. Moreover, the method provides optimal setup of gauge length during the acquisition, taking advantage of the high SNR of recorded data by long gauge length, and broad frequency spectrum by short gauge length. It provides guideline for survey design and controls to achieve advanced quality of the acquired DAS VSP data. This method can be performed in a preprocessing stage, a post-processing stage, or can be integrated into an embedded acquisition system.

Consider a quantitative relation of gauge length to wavefields of DAS VSP. Recorded continuous data stream of acquired DAS d(t, x) can be first decomposed into wavenumber (k) domain:

$$d(t, x) = \int \tilde{d}(t, k)e^{-i2\pi kx}dk \qquad (1)$$

where ~ means Fourier transform in spatial domain. The gauge length effect on the continuous data stream behaves as a spatial stacking or a boxcar filtering, and the data encoded by gauge length effect can be expressed as:

$$\begin{aligned} D_l(t, x) &= \frac{1}{l}\int_{-l/2}^{l/2} d(t, x+\delta x)d\delta x \\ &= \frac{1}{l}\int_{-\frac{l}{2}}^{\frac{l}{2}}\int \tilde{d}(t, k)e^{-i2\pi k(x+\delta x)}dkd\delta x \\ &= \int \mathrm{sinc}(kl)\tilde{d}(t, k)e^{-i2\pi kx}dk \\ &= \int \tilde{D}_l(t, k)e^{-i2\pi kx}dk \end{aligned} \qquad (2)$$

From equation (1) and (2), one can see the difference between d(t, x) and $D_l$(t, x) only lies in sinc(kl) in wavenumber k domain, where $$\mathrm{sinc}(kl) = \frac{\sin(\pi kl)}{\pi kl}.$$

An attenuation factor caused by gauge length effect can be defined to be A(k, l)=sinc(kl). Evaluation of A(k, l) versus wavenumber k for various gauge length l is shown in FIGS. 4A-4C.

Figure 4A:
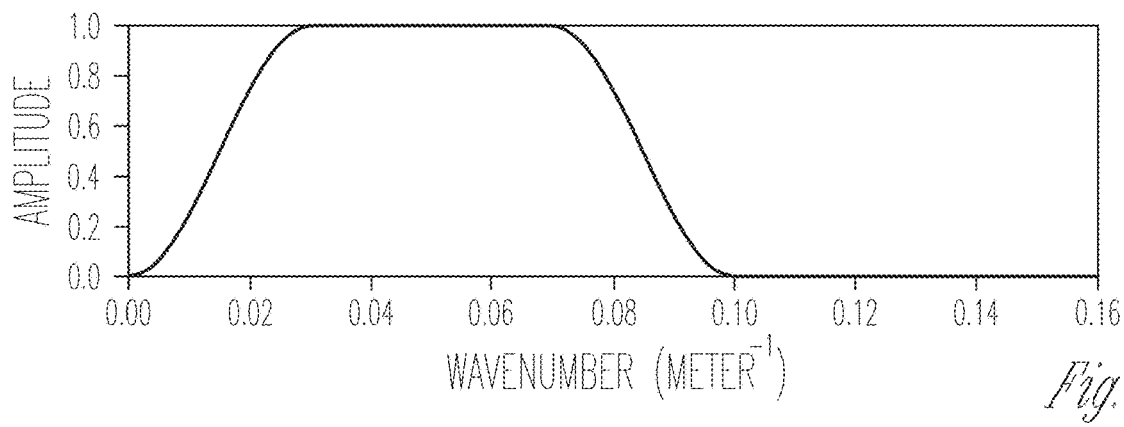
FIGS. 4A-4C are plots of amplitude versus wavenumber that provides an example of gauge length effect, in accordance with various embodiments.
Figure 4B:
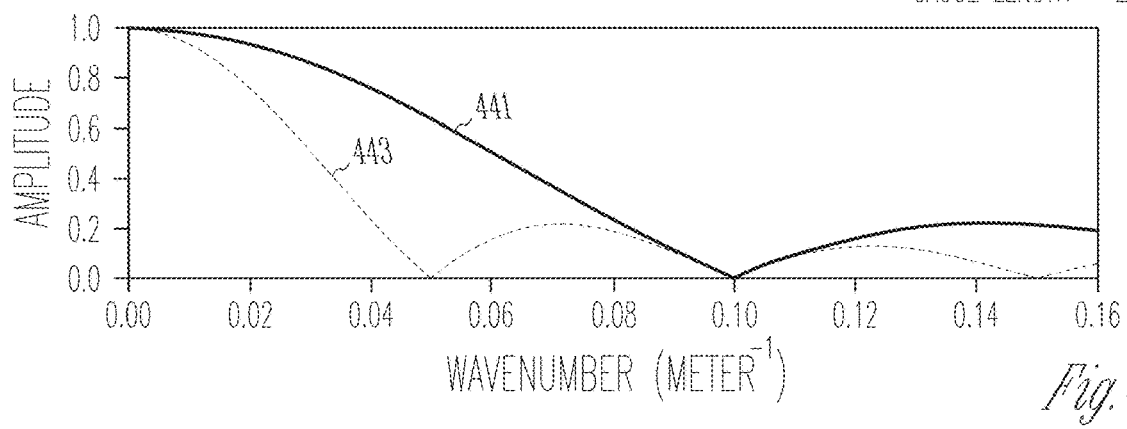
Figure 4C:
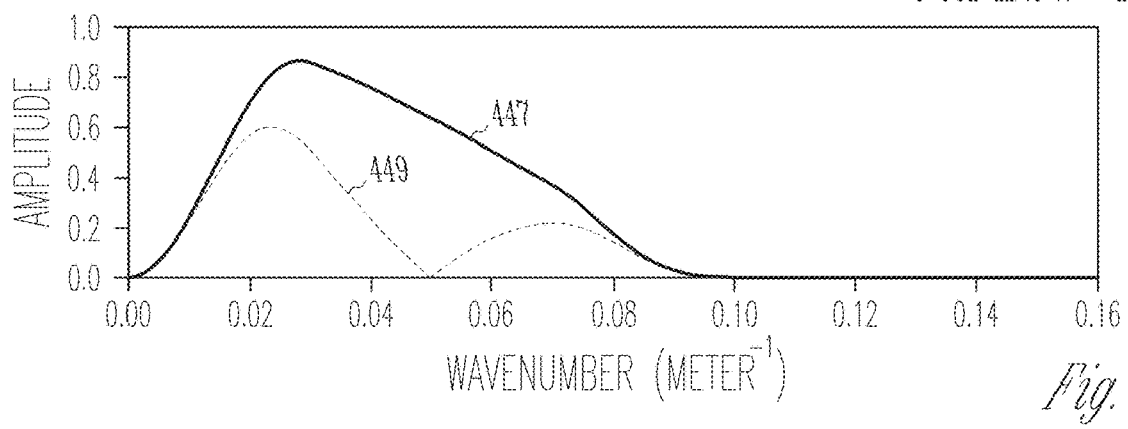

FIGS. 4A-4C are plots of amplitude versus wavenumber that provides an example of gauge length effect. FIG. 4A shows the wavenumber spectra (k-spectra) of a waveform without gauge length effect. FIG. 4B shows attenuation factors for gauge length equal to 10 meters (curve 441) and equal to 20 meters (curve 443). FIG. 4C shows k-spectra of the waveform after applying the gauge length effect to the waveform in FIG. 4A.

There are a couple of points that should be noted. The attenuation factor A(k, l) explicitly relates to wavenumber k and gauge length l. A(k, l)=1 for gauge length of l=0; it indicates that the continuous data stream is equivalent to the discrete wavefields without gauge length effect. The attenuation factor A(k, l) is independent of temporal variable t, but implicitly relates to the temporal frequency f given the dispersion relation f=f (k). The attenuation factor A(k, l) only distorts the amplitude in k domain but not the phase. There are zeros in the attenuation factor A(k, l) when kl=n, where n is a positive integer.

In wavenumber k domain, the wavefields of gauge length l can be written as:

$$\tilde{D}_l(t, k) = A(k, l) \cdot \tilde{d}(t, k) \qquad (3)$$

An illustration of the two different gauge lengths (10 meters and 20 meters) affecting on a boxcar spectrum can be seen in FIGS. 4A-4C. However, as found in FIGS. 4A-4C, since there are a number of zeros in A(k, l), it is not direct to perform division of $\tilde{D}_l$(t, k) and A(k, l) to invert the wavefields that are free of gauge length d̃(t, k). In an embodiment, a method to perform conditional summation of equation (3) for each time slice t may be implemented as:

$$\sum_{\{l\}} \text{sgn}(A(k, l)) \cdot \tilde{D}_l(t, k) = \tilde{d}(t, k) \cdot \sum_{\{l\}} |A(k, l)| \quad (4)$$

where sgn(•) is the sign function, and |•| is an operator to retrieve the absolute value of the functions within the | |. A summation $\Sigma_{\{l\}}$ can be structured to sum over the inner function of all acquired/known gauge lengths. The reason to sum over the absolute values of attenuation factors is that the zeros of the attenuation factors vary for different gauge length, and summed values will not be zeros unless they are the common zeros of all acquired/prior known gauge lengths. Hence, if the gauge length is set properly, the common zeros can be at very large wavenumber, which could be out of the range of interest. Hence, a conservative low-pass filter in wavenumber domain can be applied for inversion, since such a low pass filter does not change the dominant wavenumber contents, as in, $\tilde{f}_{k_{uplim}}(k) \cdot d(t, k) \approx d(t, k)$, where uplim refers to upper limit. The inversion then can be performed by:

$$\tilde{d}(t, k) = \tilde{f}_{k_{uplim}}(k) \cdot \frac{\sum_{\{l\}} \text{sgn}(A(k, l)) * \tilde{D}_l(t, k)}{\sum_{\{l\}} |A(k, l)|}. \quad (5)$$

In addition, the prediction of the wavefields for an arbitrary gauge length L can be given by:

$$\tilde{D}_L(t, k) = \tilde{f}_{k_{uplim}}(k) \cdot A(k, L) \cdot \frac{\sum_{\{l\}} \text{sgn}(A(k, l)) * \tilde{D}_l(t, k)}{\sum_{\{l\}} |A(k, l)|} \quad (6)$$

In equations (5) and (6), $\tilde{f}_{k_{uplim}}(k)$ denotes a nominal low pass filter in k domain, where the cut-off wavenumber is $k_{uplim}$. To prevent the zeros in equation (5) and (6), the relation of $k_{uplim}$ and known gauge lengths {l} can be derived as:

$$k_{uplim} \leq \frac{1}{GCD\{L\}}, \quad (7)$$

where GCD{•} is an operator generating a greatest common divisor (GCD). For instance, GCD{20, 30}=10, and GCD{1.5, 0.3, 0.2}=0.1. By application of equations (5) and (6) subject to condition of equation (7), one can obtain wavefields free of gauge length effect, and wavefields of arbitrary gauge lengths.

Figure 5A:
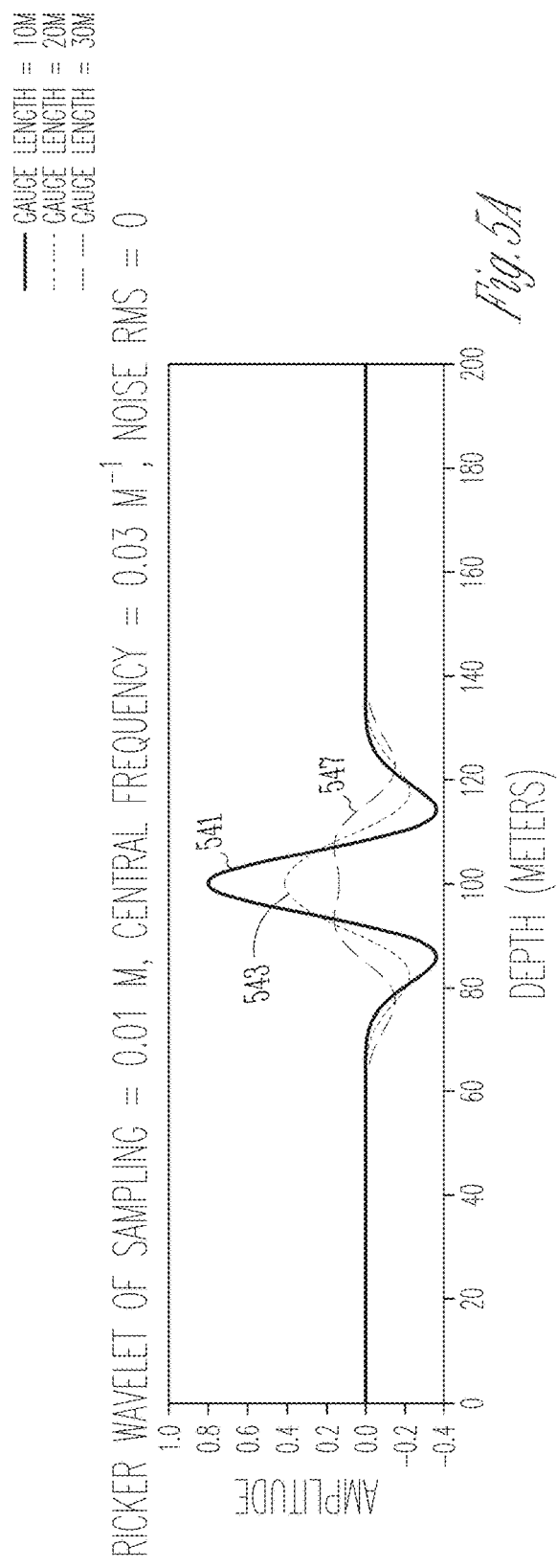
FIGS. 5A, 5B, and 6-9 show a synthetic example of inverting a Ricker wavelet free of gauge length and predicting a Ricker wavelet subjected to a designated gauge length from the wavelets of known gauge lengths, in accordance with various embodiments.
Figure 5B:
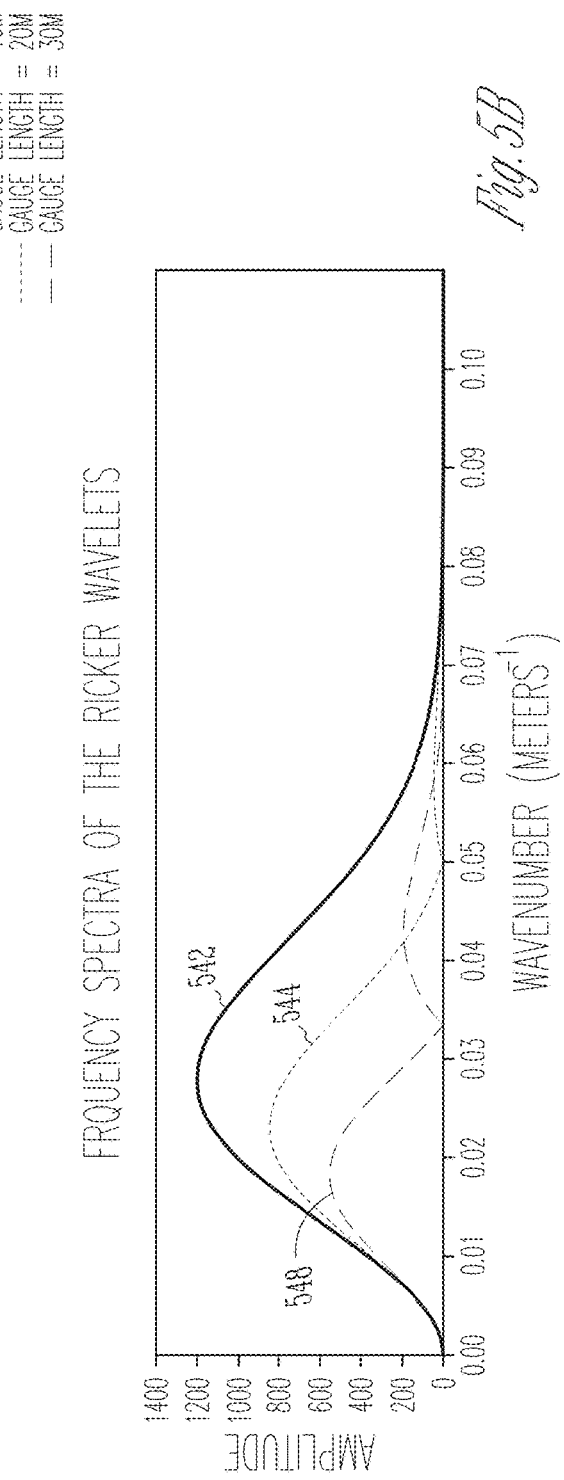

FIGS. 5A, 5B, and 6-9 show a synthetic example of inverting a Ricker wavelet free of gauge length and predicting a Ricker wavelet subjected to a designated gauge length from the wavelets of known gauge lengths. FIG. 5A is a plot of amplitude versus depth for synthetic Ricker wavelets subjected to different gauge lengths. FIG. 5A shows the waveforms in the temporal domain of a set of Ricker wavelets subjected to gauge lengths of 10 meters (curve 541), 20 meters (curve 543), and 30 meters (curve 547). Wavelets of gauge lengths of 20 and 30 meters are set as known, and the wavelet of gauge length of 10 meters is set as unknown. The continuous data stream, which is equivalent to the wavelet of 0-meter gauge length, has a spatial sampling rate of 0.01 meter, and the central spatial frequency (wavenumber) is 0.03 meter$^{-1}$. No additive noise is present in this example. FIG. 5B is a plot of amplitude versus wavenumber for: the corresponding wavenumber spectra (k-spectra) of the Ricker wavelets shown in FIG. 5B. FIG. 5B shows the corresponding wavenumber spectra of the three wavelets for gauge lengths of 10 meters (curve 542), 20 meters (curve 544), and 30 meters (curve 548).

Figure 6:
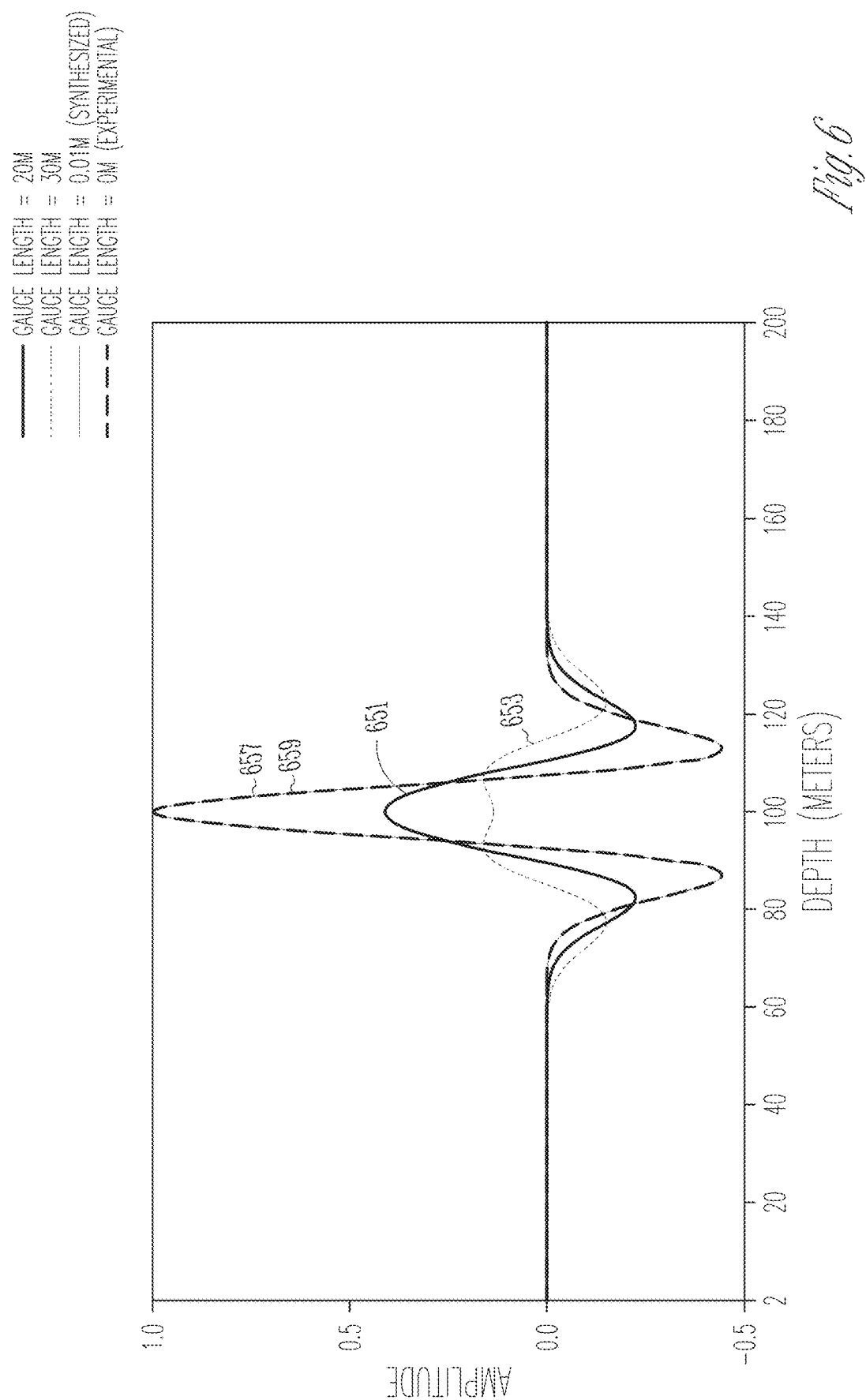
Figure 7:
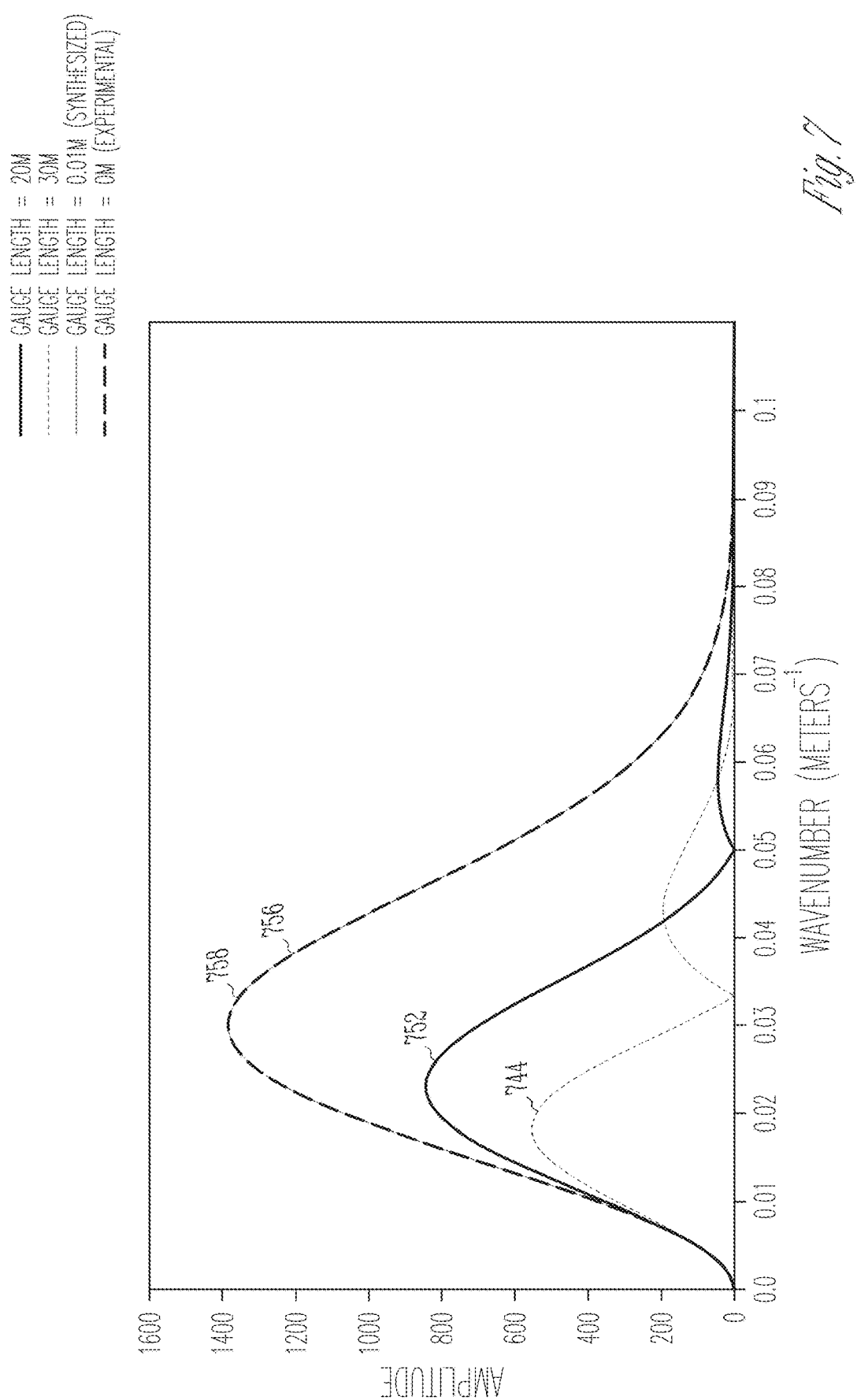

FIG. 6 is a plot of amplitude versus depth for a set of spatial waveforms of different gauge length. The known waveforms are of gauge length 20 meters (curve 651) and 30 meters gauge (curve 653). The waveform of curve 657 is of gauge length 0.01 meter, which is asymptotic to gauge-length-free waveform. Curve 659 denotes the predicted gauge-length-free waveform. FIG. 7 is a plot of amplitude versus wavenumber for the set of waveforms corresponding to FIG. 6 showing the corresponding spectra of the inverted wavelet. Curve 752 corresponds to the waveform of gauge length 20 meters, and curve 754 corresponds to the waveform of gauge length 30 meters. Curve 756 corresponds to the waveform of gauge length 0.01 meters, and curve 758 corresponds to the predicted gauge-length-free waveform. Both the waveforms and the spectra clearly show that the inverted gauge-length-free wavelet fits exactly with the continuously recorded wavelet of gauge length 0.01 meter, which is asymptotically close to the true wavelet that is free of gauge length effect.

Figure 8:
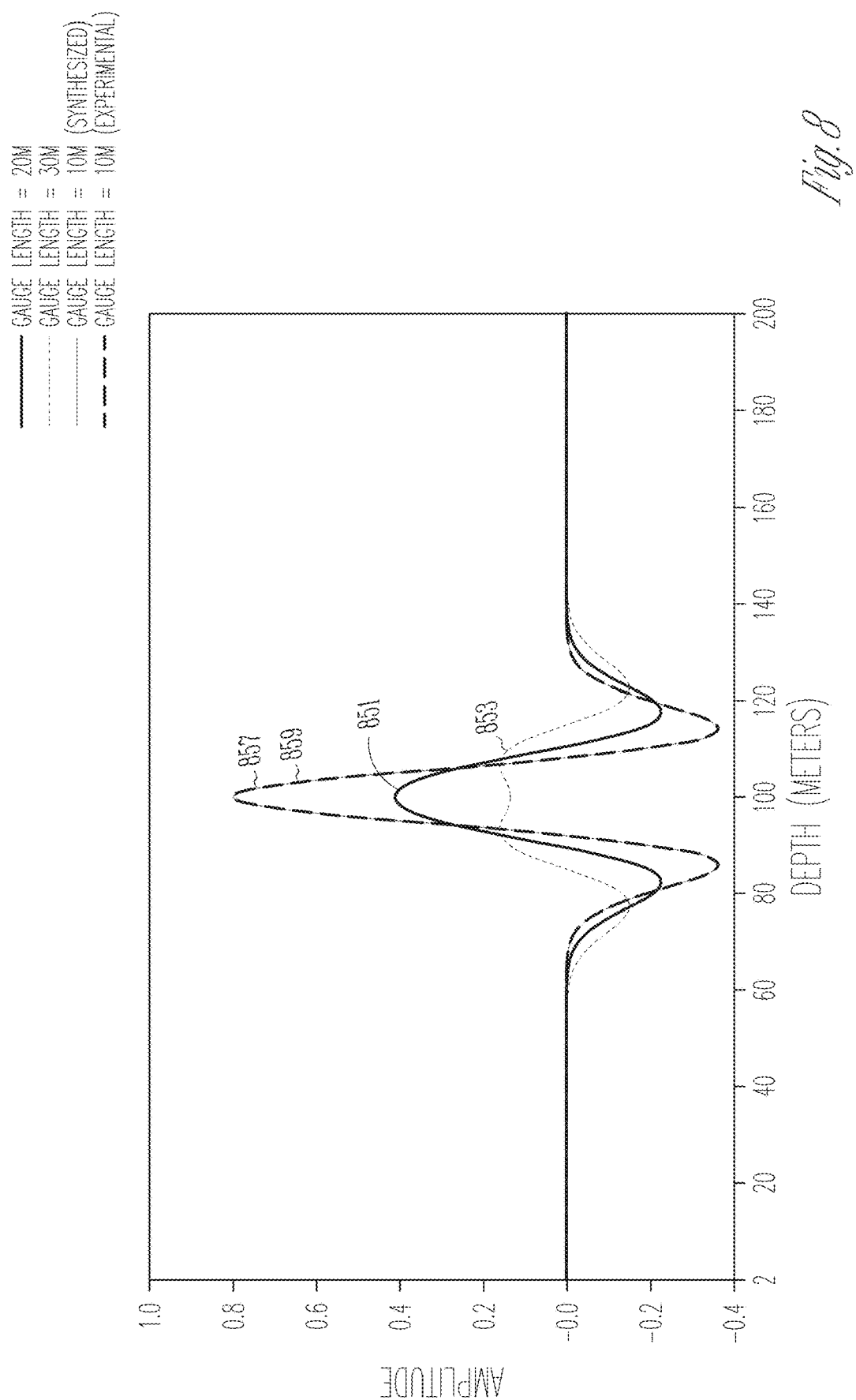
Figure 9:
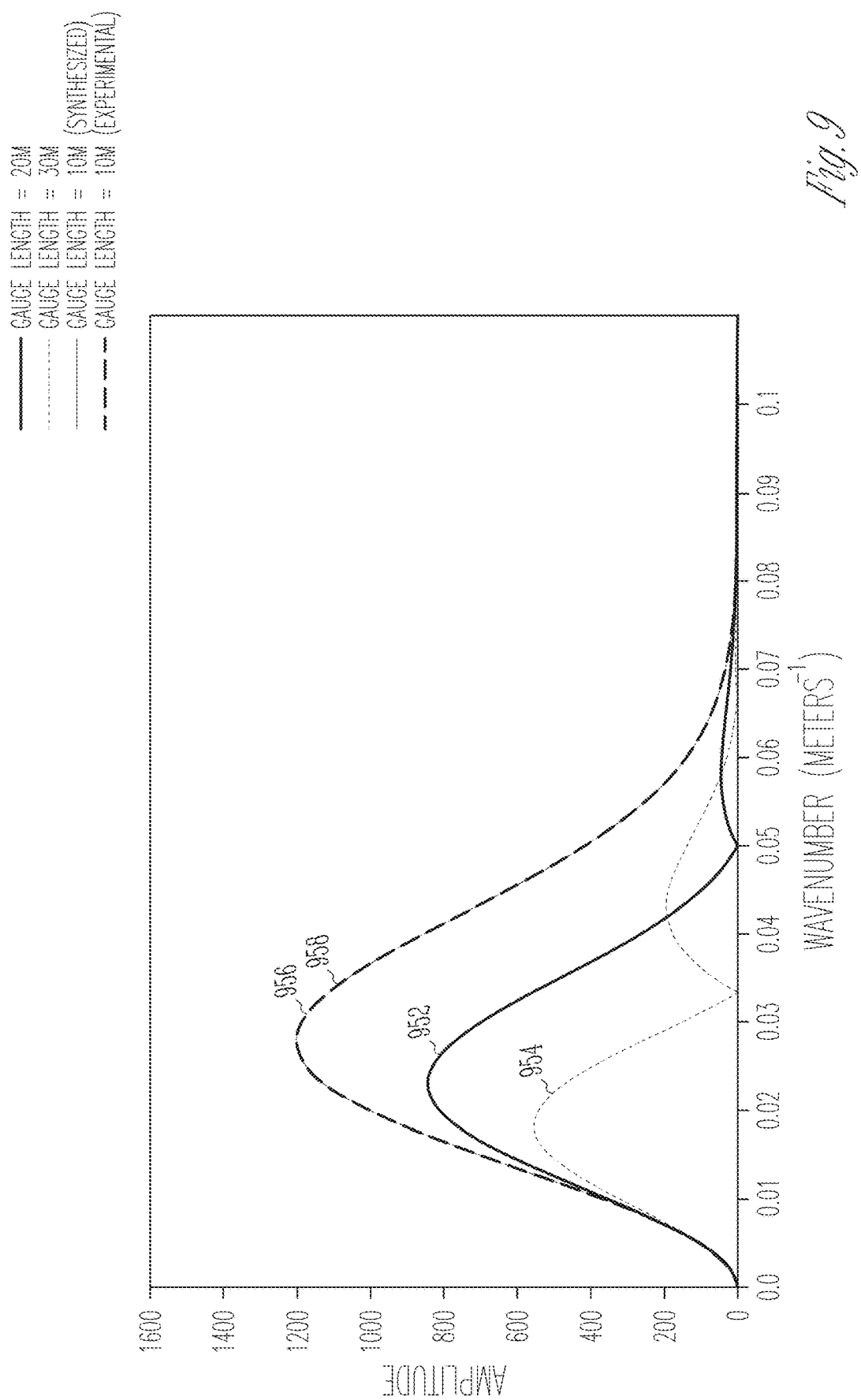

FIG. 8 is a plot of amplitude versus depth for a set of spatial waveforms of different gauge lengths. The known waveforms are of gauge length of 20 meters (curve 851) and of 30 meters (curve 853). The waveform of curve 857 is of gauge length 10 meters, computed from the continuous data stream from waveform of gauge lengths of 20 and 30 meters. Curve 859 denotes the predicted waveform of gauge length 10 meters. FIG. 9 is a plot of amplitude versus wavenumber for the set of waveforms corresponding to FIG. 8 showing the corresponding wavenumber spectra. Curve 952 corresponds to the waveform of gauge length 20 meters, and curve 954 corresponds to the waveform of gauge length 30 meters. Curve 956 corresponds to the waveform of gauge length 10 meters, and curve 958 corresponds to the predicted waveform of gauge length 10 meters. Similarly, both the waveforms and the spectra show a good match between the inverted wavelet of 10-meter gauge length and that derived from the continuously recording of gauge length 0.01 meter. Here $k_{uplim}$ is chosen to be 0.1 m$^{-1}$. The inversion for gauge length-free and 10-meter gauge shows the possibility to remove the gauge length effect and to predict wavefields of arbitrary gauge length by compensating the sinc function using multiple gauge length.

Figure 10:
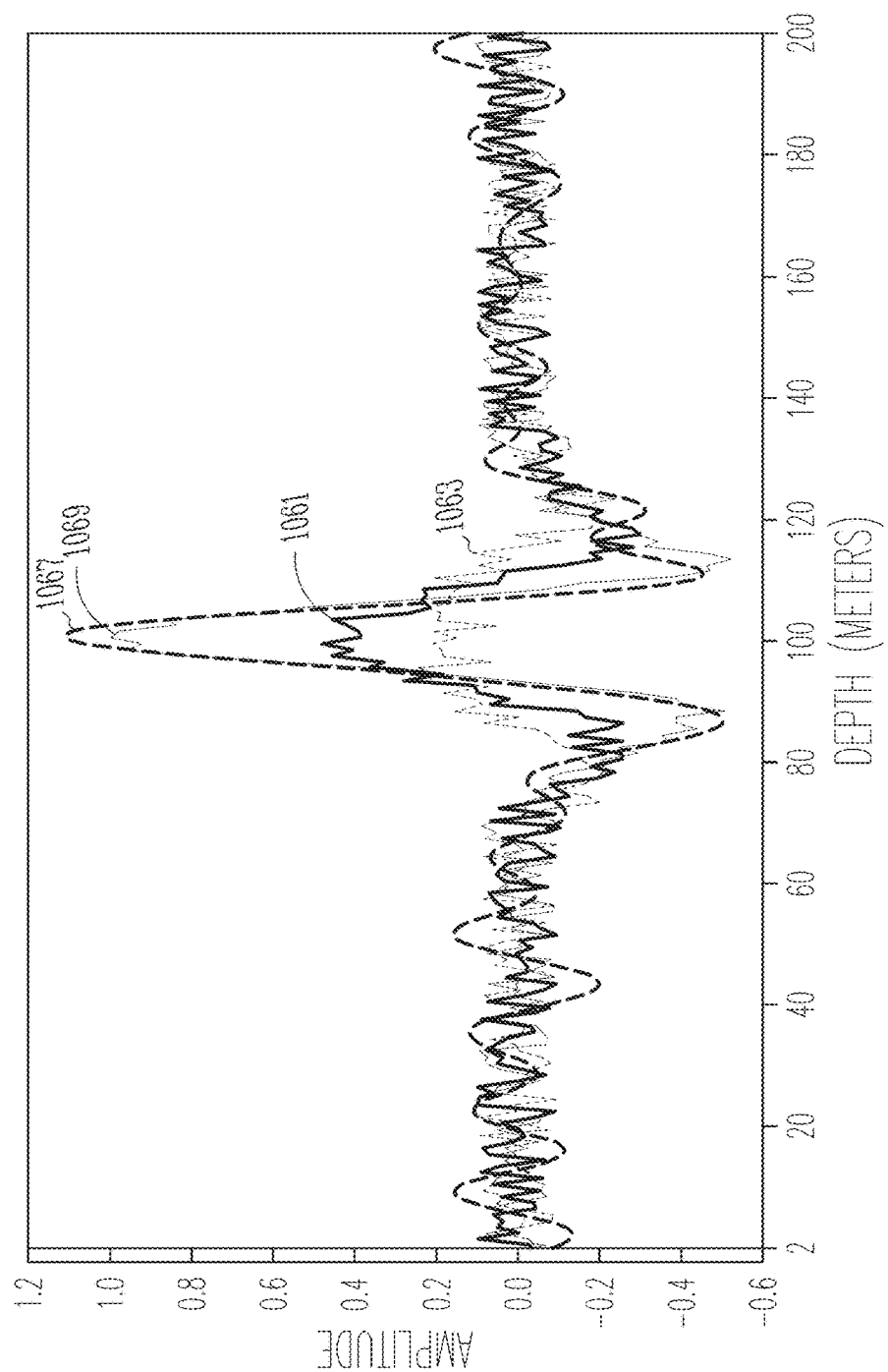
FIG. 10 is a plot of amplitude versus depth of waveforms of different gauge lengths, in accordance with various embodiments.
Figure 11:
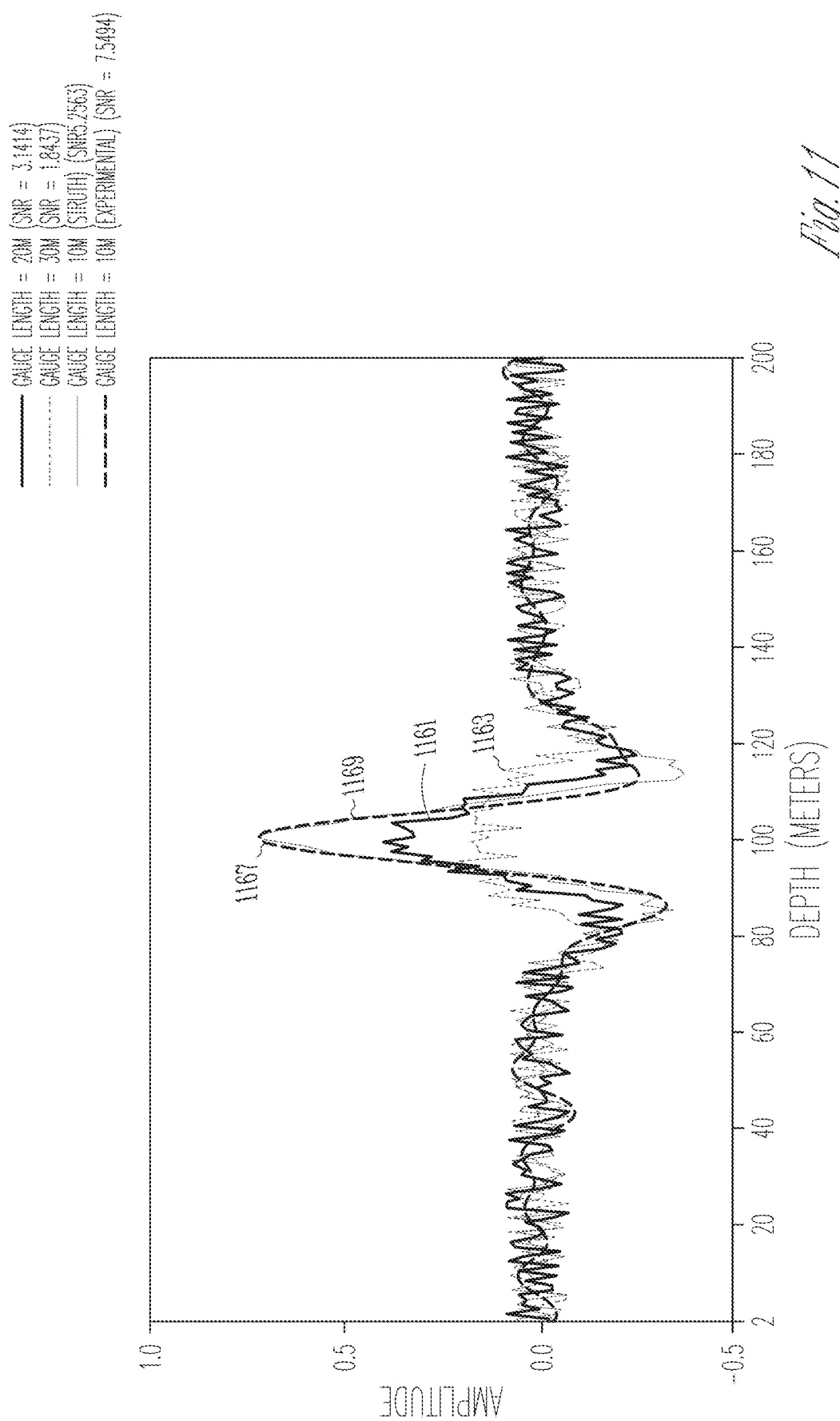
FIG. 11 is a plot of amplitude versus depth of waveforms of different gauge lengths, in accordance with various embodiments.

Consider the noise resistance of the embodiments to the methods taught herein. There are two cases for incorporating the random noise. The first case is that wavefields of different gauge lengths are acquired from the same continuous data stream, which contains certain level of noise. The second case is that wavefields of different gauge lengths contain their respective systematic noise, or they are acquired from different data streams. The first case is straight forward to handle since the noise in these wavefields is identical and encoded by different gauge length. Such noise can be considered as part of the signal, and the conclusion still holds as for noise-free case. The second case is closer to the reality for testing the noise resistance of these methods. FIG. 10 and FIG. 11 show the same synthetic example except for the presence of random noise, where the noise presence is in the second case.

FIG. 10 is a plot of amplitude versus depth of waveforms of different gauge lengths. The known waveforms are of gauge length of 20 meters with a SNR of 3.1414 (curve 1061) and gauge length of 30 meters with a SNR of 1.8437

(curve 1063) with additive Gaussian noise. The sampling spacing is 1 meter and the noise is applied on the sampling spacing. Curve 1069 denotes the waveform of gauge length 0.01 meter, which is asymptotic to gauge-length-free waveform. Curve 1067 denotes the predicted gauge-length-free waveform. FIG. 11 is a plot of amplitude versus depth of waveforms of different gauge lengths. The known waveforms are of gauge length of 20 meters with a SNR of 3.1414 (curve 1161) and gauge length of 30 meters with a SNR of 1.8437 (curve 1163) with additive Gaussian noise. The sampling spacing is 1 meter and the noise is applied on the sampling spacing. Curve 1169 denotes the waveform of gauge length 10 meters, which is computed from the continuous data stream, and curve 1167 denotes the predicted waveform of gauge length 10 meters.

The gauge length-free waveform (curve 1067) in FIG. 10 is computed from the waveform of gauge length 20 meters and 30 meters. It matches the waveform of gauge length 0.01 meter (curve 1069) sampled at 1 meter spacing, which is asymptotic to the true gauge length-free wavefields. Moreover, the predicted waveform has a low pass filtering compared with that of gauge length 0.01 meter. The low pass filter $\tilde{f}_{k_{uplim}}(k)$, as stated in equation (5), constrains the bandwidth of the prediction. Here the upper bound of the low pass filter is chosen to be 0.08 m$^{-1}$, in order to conform with condition (7). The noise level added to the waveforms of different gauge length are the same, but the SNR may vary due to the variation of signal strength by gauge length effect.

Figure 12A:
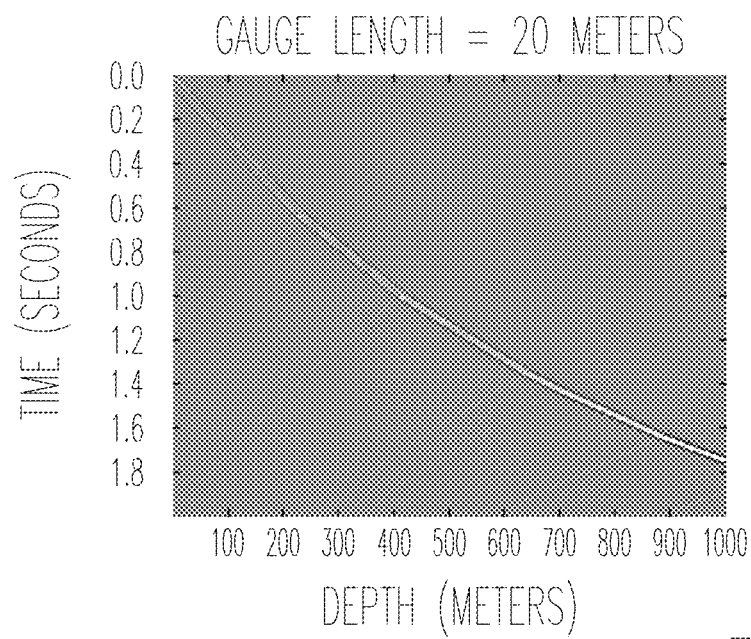
FIGS. 12A and 12B are presentations of two-dimensional synthetic seismic data, in accordance with various embodiments.
Figure 12B:
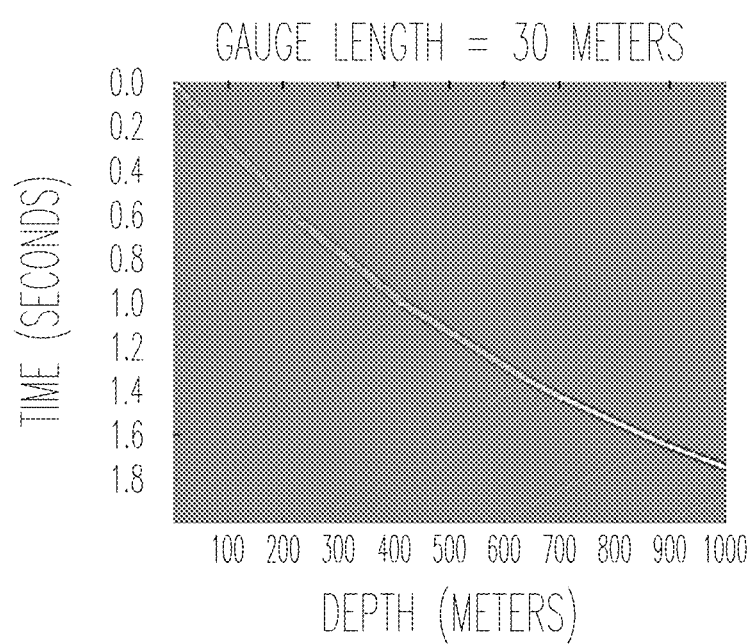
Figure 13A:
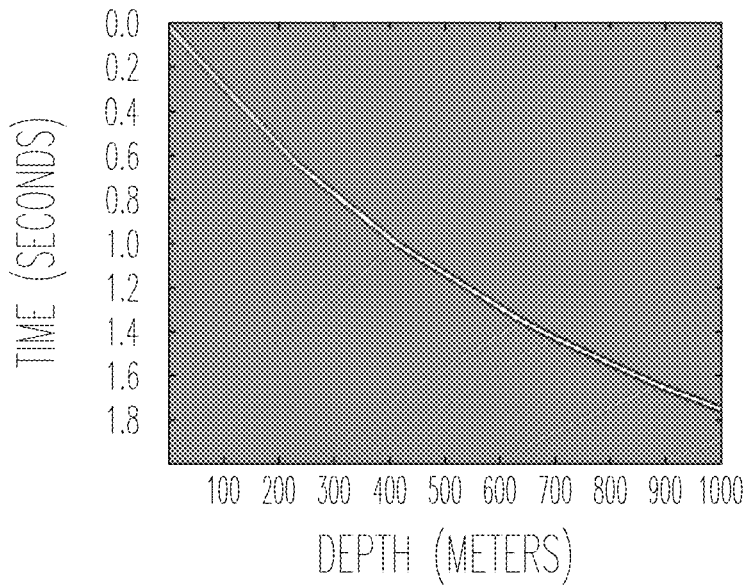
FIG. 13A is a representation of wavefields of 10-meter gauge length predicted from that of 20-meter gauge length and 30-meter gauge length simultaneously, in accordance with various embodiments.
Figure 13B:
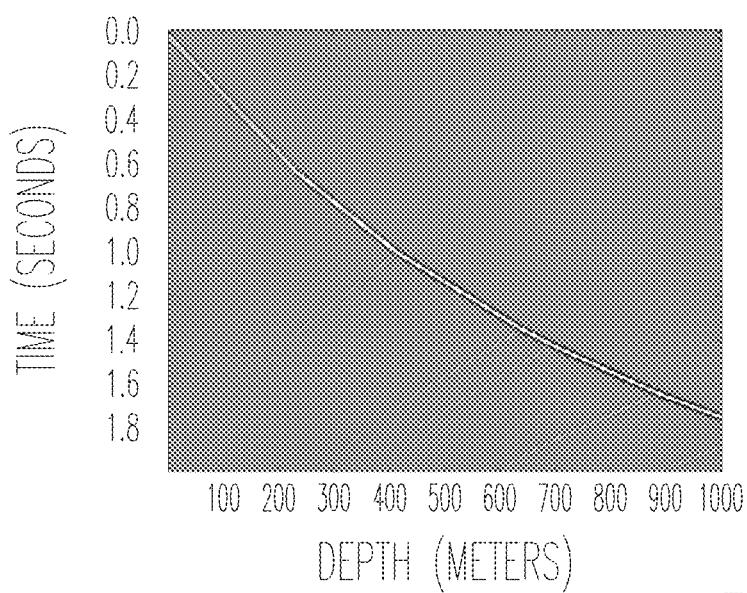
FIG. 13B is representation of wavefields of 10-meter gauge length synthesized from continuous data stream, in accordance with various embodiments.
Figure 14A:
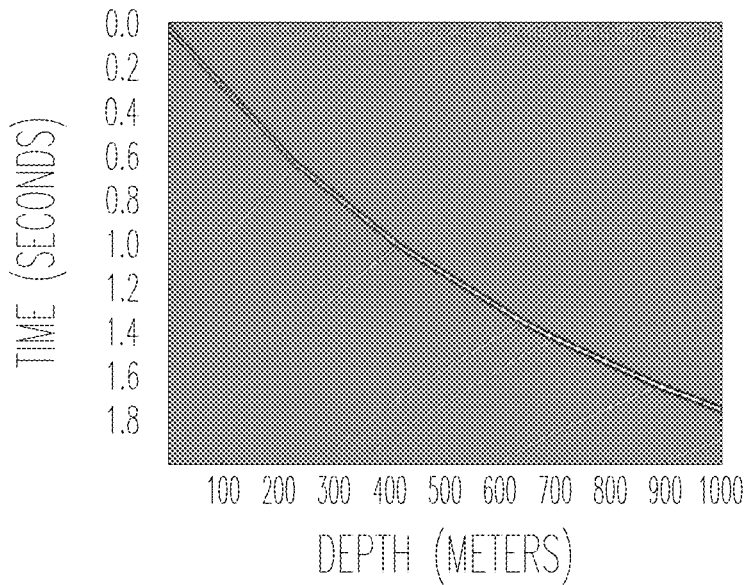
FIG. 14A is a representation of wavefields of 0-meter (infinitesimal) gauge length predicted from that of 20-meter and 30-meter gauge length simultaneously, in accordance with various embodiments.
Figure 14B:
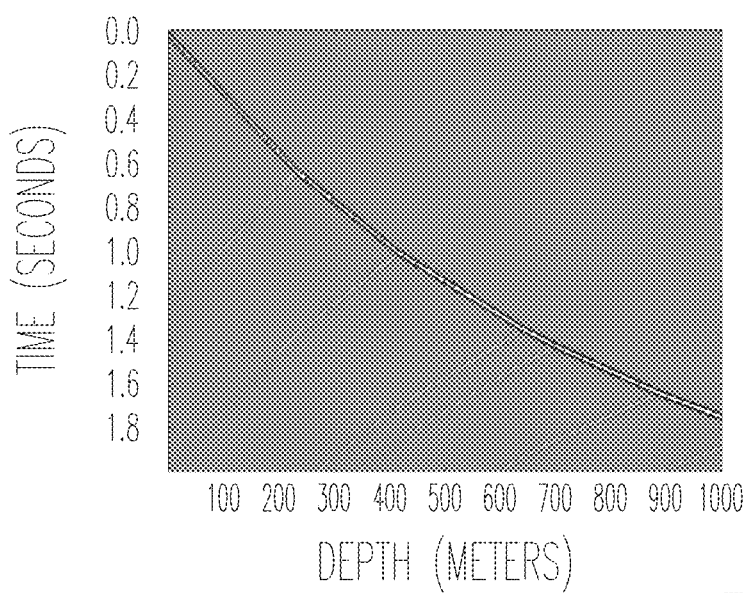
FIG. 14B is a representation of wavefields of 0-meter (or infinitesimal) gauge length synthesized from continuous data stream, in accordance with various embodiments.

The approach of the techniques taught herein was tested using 2D synthetic data that mimics seismic responses. Data of gauge length of 20 meters and of 30 meters were acquired in the field. The temporal sampling rate was 0.5 milliseconds, and the spatial sampling rate was 1 meter. FIGS. 12A and 12B are presentations of 2D synthetic seismic data recapped from FIGS. 2B and 2C acquired using gauge length 20 meters (FIG. 12A) and 30 meters (FIG. 12B), respectively. FIG. 13A is a representation of wavefields of 10-meter gauge length predicted from that of 20-meter gauge length and 30-meter gauge length simultaneously. FIG. 13B is representation of wavefields of 10-meter gauge length synthesized from continuous data stream. FIG. 14A is a representation of wavefields of 0-meter (infinitesimal) gauge length predicted from that of 20-meter and 30-meter gauge length simultaneously. FIG. 14B is a representation of wavefields of 0-meter (or infinitesimal) gauge length synthesized from continuous data stream.

On the one hand, from the noise analysis above, it is excepted that the wavefields of 20 meter gauge length and 30 meter gauge length have higher SNR, including strong signal presence and weaker random noise level than that of 10-meter gauge length. On the other hand, the wavefields of 10-meter gauge length has a broader spectrum, both temporally and spatially. The wavenumber spectra (k-spectra) of the wavefields can be seen in FIG. 15. The predicted wavefields of gauge length 10 meters resembles the recorded one, as can be seen from the wavefields (FIGS. 13A-13B) and the spectrum (FIG. 15).

Figure 15:
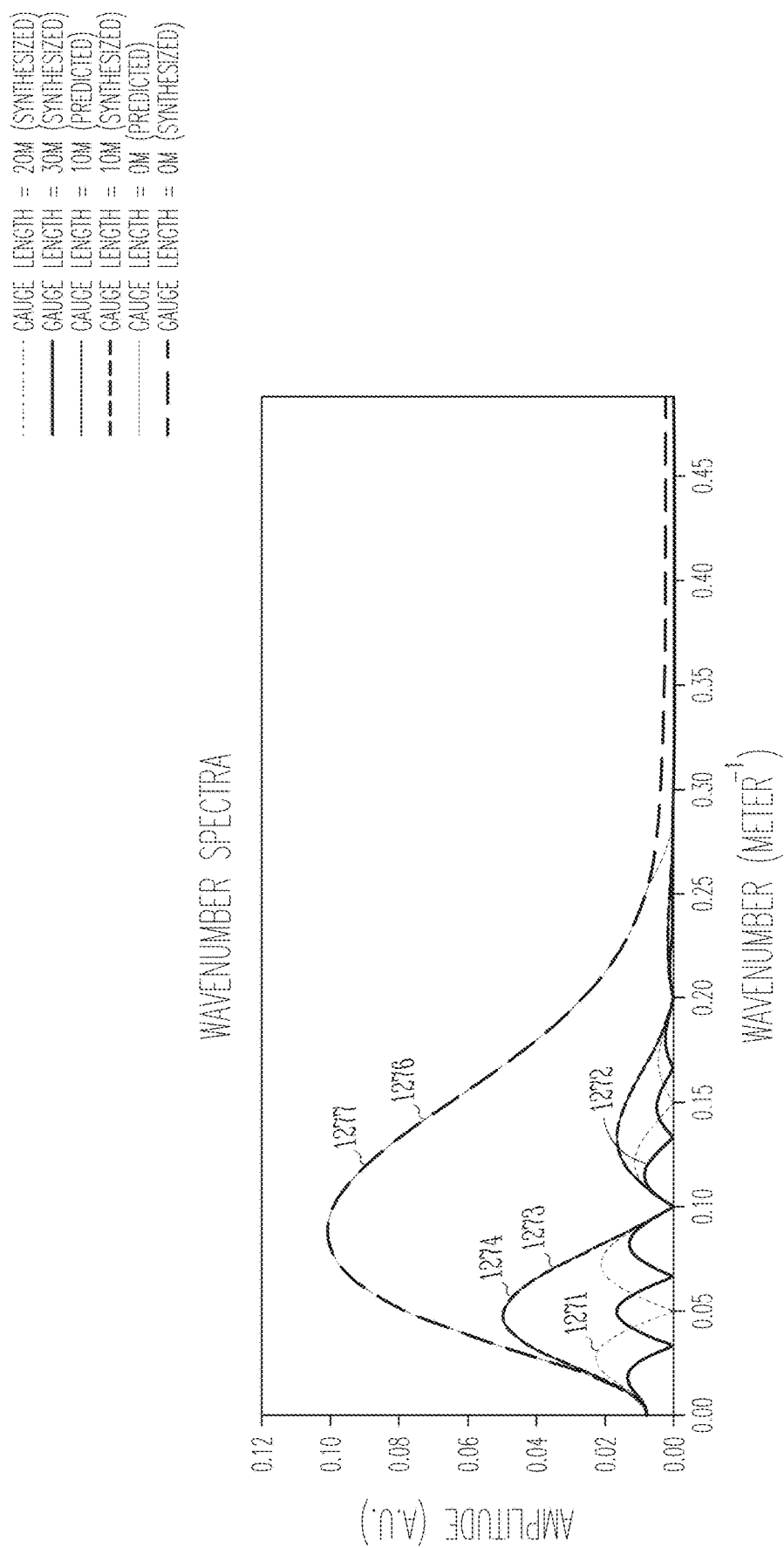
FIG. 15 is a plot of amplitude versus wavenumber providing wavenumber spectra corresponding to FIGS. 12A-14B, in accordance with various embodiments.

FIG. 15 is a plot of amplitude versus wavenumber providing wavenumber spectra corresponding to FIGS. 12A-14B. The wavenumber spectra are averaged over time. Curve 1271 corresponds to a synthesized wavefield of 20-meter gauge length. Curve 1272 corresponds to a synthesized wavefield of 30-meter gauge length. Curve 1273 corresponds to a predicted wavefield of 10-meter gauge length. Curve 1274 corresponds to a synthesized wavefield of 10-meter gauge length. Curve 1276 corresponds to a predicted wavefield of 0-meter gauge length. Curve 1277 corresponding to a synthesized wavefield of 0-meter gauge length.

FIG. 14A shows the predicted gauge length-free wavefields from that of gauge length 20 and 30 meters. Even sharper events are seen from the gauge length-free wavefields compared to the recorded ones, resulting in broader spectrum (FIG. 15, curve 276). Note that there is slight amplitude decay larger than wavenumber 0.25 meter$^{-1}$, which results from using a low pass filter $\tilde{f}_{k_{uplim}}(k)$ in order to suppress the singularity from small-valued amplitudes of frequency spectra. Usually, it is recommended to set $k_{uplim}$ at the upper bound, subject to condition (7), to avoid singularities of the spectrum and the wavefields.

From the 2D synthetic seismic data example, one may conclude the approach taught herein for removing the gauge length effect and predicting the wavefields of arbitrary gauge length is feasible and effective. By applying the approach, one may obtain the gauge length-free data for further processing and analysis, as well as high-quality data with both broad spectrum and optimized noise level.

Moreover, the approach taught herein also provides guidance for optimizing the design of the gauge lengths in an interrogator unit, for example the interrogator 325 of system 300 of FIG. 3. The design of the gauge lengths should satisfy the following criteria. The wavenumber $k_{uplim}$ should be optimally larger than the boundary of which the effective signal energy is located. The designed gauge lengths should be within the hardware limit, including the concern of SNR. The designed gauge lengths should have evenly spaced zeros, and their corresponding attenuation factors by gauge length effect should be well interlaced, that is, the peaks of the attenuation factor should be the troughs of another or several attenuation factors of other gauge lengths.

The following provides an elaboration of the abovementioned criteria. For acquired DAS VSP data, there is a physical lower limit of the phase velocity $v_{lower}$, below which are mostly incoherent noise and non-geophysical events (coherent noise). For various types of seismic sources, such as vibroseis, air guns, weight drops, dynamites, etc., their spectrum has an upper boundary $f_{upper}$. Here, the seismic attenuation (Q effect) is not considered, and $f_{upper}$ are kept unchanged throughout the depth covered by DAS channels. The ideal upper bound of $k_{uplim}$, in the conservative sense, can be derived as:

$$\frac{1}{GCD\{L\}} \geq k_{uplim} \geq \frac{f_{upper}}{v_{lower}}, \qquad (8)$$

Hence, are a range of choices if equation (9) is satisfied.

$$GCD\{L\} \leq \frac{v_{lower}}{f_{upper}}, \qquad (9)$$

Take the field data as an example again. The sweep chirp can range from 6 Hz to 96 Hz, and the lowest phase velocity, can be conservatively taken as 1000 m/s (⅔ of the sound velocity in water). In this case, GCD{L} should be smaller than 10.4 m. The choice of gauge lengths in this survey was 10 and 20 meters. Hence, it is safe to remove the gauge length effect without contaminating the signal component.

Secondly with respect to the criteria, an interrogator unit can record the continuous data stream, typically with a sampling frequency 10,000 Hz, as an example. The output data from an interrogator unit can be encoded by stacking the continuous data stream within the span of designated gauge lengths. Given that the continuous data stream can be highly contaminated by random noise, data stacked with a very short gauge length can be anticipated to have extremely high level of noise. The lower limit of gauge length restrained by hardware design is denoted as $L_{hardware}$. In practice, the data recorded using very small gauge length could be served as information of the noise floor of the DAS system. Depending on different design of the hardware noise control, the lower limit of the gauge length can be, but is not restricted to, 1 to 5 meters for a contemporary interrogator design.

Thirdly with respect to the above criteria, since the GCD of the gauge length has an upper bound $$\frac{f_{upper}}{v_{lower}}$$

Figure 16:
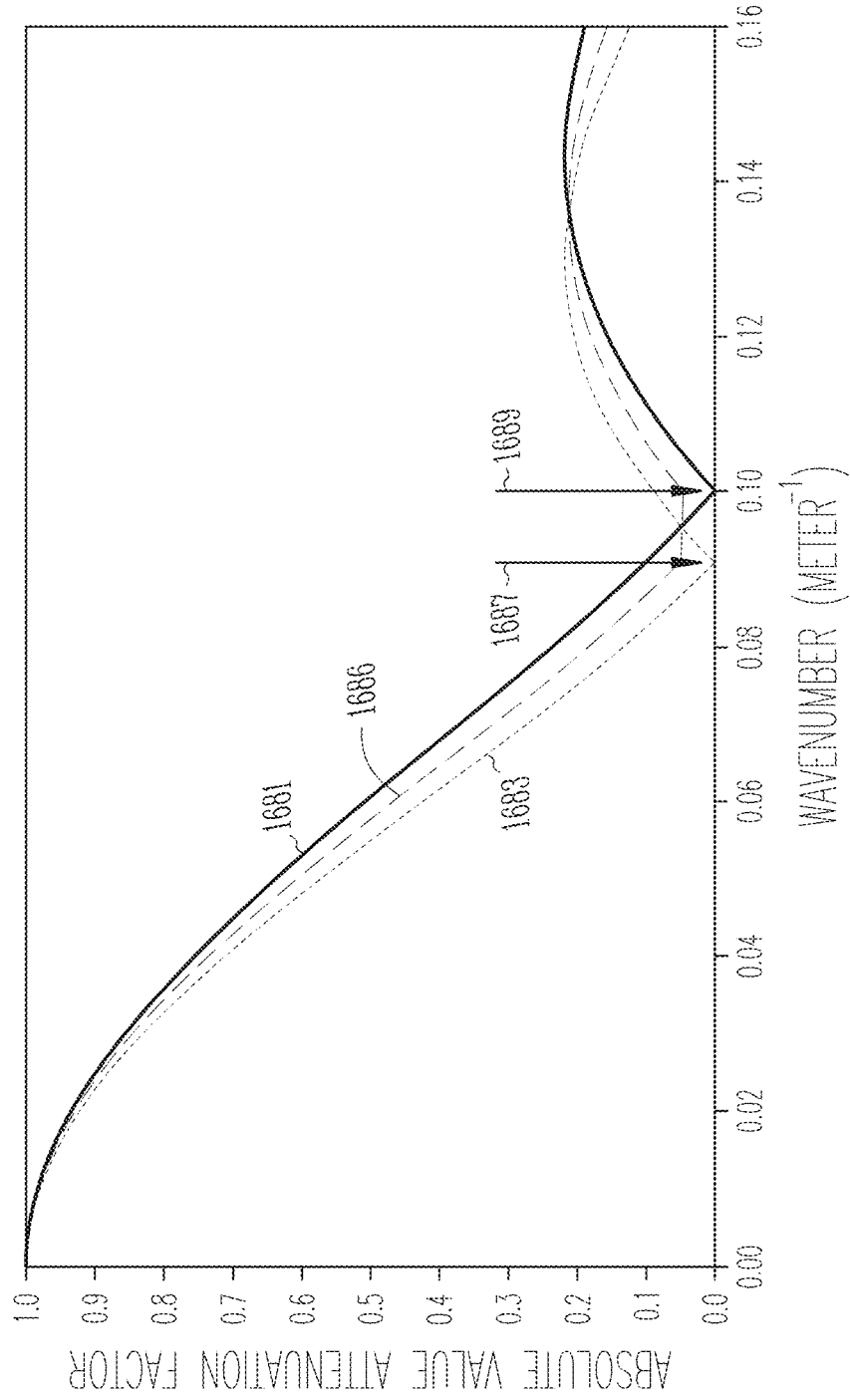
FIG. 16 is a plot of attenuation factors versus wavenumber for different gauge lengths, in accordance with various embodiments.

(condition of equation (9)), it is straightforward to design two or more gauge lengths that are co-prime to others, and very close in values. For instance, for a gauge length 10 meters and a gauge length of 11 meters, it is intuitive to have a GCD of 1 meter. However, such design is suboptimal due to the close position of zeros of their attenuation factors of gauge length effect, as shown in FIG. 16. FIG. 16 is a plot of attenuation factors versus wavenumber for different gauge lengths. Curve 1681 denotes the attenuation factor of gauge length of 10 meters, and curve 1683 denotes that of gauge length of 11 meters. The arrow 1687 denotes a zero position of curve 1683 and arrow 1689 denotes a zero position of curve 1681. Curve 1686 denotes the average of the two attenuation factors of curves 1681 and 1683. Showing the average, rather than the sum as shown in equations (5) and (6), provides a mechanism of comparing with the individual attenuation factors. The summation of the two attenuation factors cannot compensate zeros in individual attenuation factors very well, as seen from curve 1686 in FIG. 16 that the sum (shown in average) remains small in the wavenumber range 0.09 to 0.1 $m^{-1}$. This makes the removal of gauge length effect and prediction of arbitrary gauge length very unstable, especially when there is certain level of noise in any of the wavefields.

Figure 17:
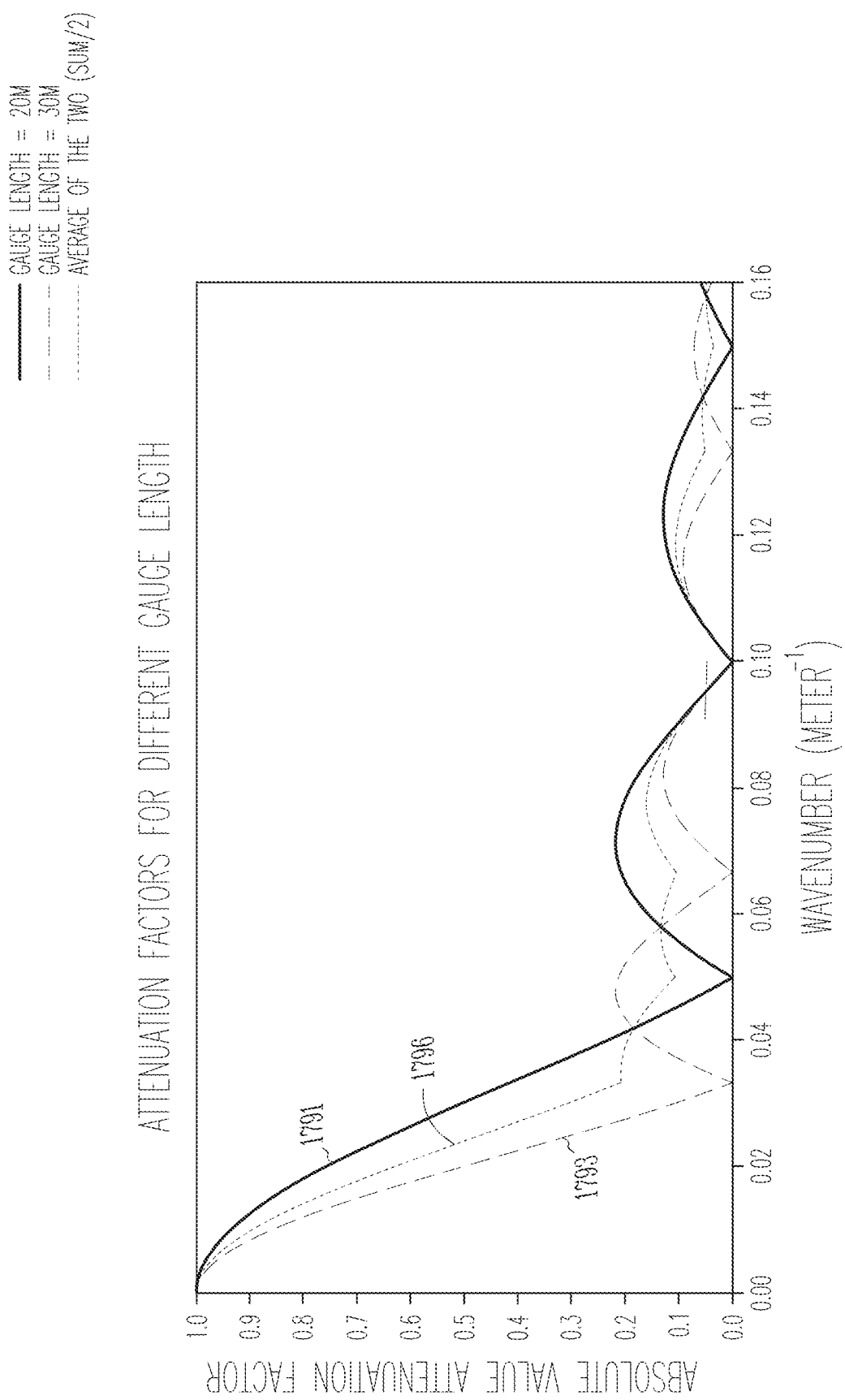
FIG. 17 is a plot of attenuation factor versus wavenumber for different gauge lengths, in accordance with various embodiments.

Therefore, a scheme to have (almost) evenly distributed zeros of the attenuation factors of different gauge length is important and desirable for the gauge length design in interrogator unit. To achieve the gauge length of 10 meters, one possible choice for two gauge lengths could be 20 meters and 30 meters. FIG. 17 is a plot of attenuation factor versus wavenumber for different gauge lengths. Curve 1791 denotes the attenuation factor for gauge length of 20 meters, and curve 1793 denotes the attenuation factor for gauge length of 30 meters. Curve 1796 denotes the average of the two attenuation factors. As can be seen in FIG. 17, the attenuation factor for gauge length of 30 meters almost reaches a peak when the attenuation factor for gauge length of 20 meters is at its zero (0.05 $m^{-1}$); meanwhile, attenuation factor for gauge length of 20 meters are of reasonable large value or peak when the attenuation factor for gauge length of 30 meters is at its zeros (0.033 and 0.067 $m^{-1}$). Curve 1796 shows that the sum of the attenuation factors of the two gauge lengths are nonzero before the first zeros of gauge length 10 meters (0.1 $m^{-1}$). An example of predicting the wavefields of gauge length 10 meters from that of wave-fields of gauge length of 20 meters and wavefields of gauge length of 30 meters can be seen from FIGS. 5A to 9.

In an embodiment, a scheme for multiple gauge length design may be performed in a cascaded manner. From condition of equation (9), a desired gauge length, $L_{desired}$, may first be chosen which is the GCD for the gauge lengths to be designed. If there are two gauge lengths to design, $L_1$ and $L_2$, one may choose $L_1=2L_{desired}$, and $L_2=3L_{desired}$. If there are three gauge lengths to design, $L_1$, $L_2$, and $L_3$, $L_1$ can break down to $L'_1=2L_1=4L_{desired}$, and $L'_3=3L_1=6L_{desired}$. If there are four gauge lengths, $L_1$, $L_2$, $L_3$, and $L_4$, to design, $L_2$ can break down to $L'_2=2L_2=6L_{desired}$, and $L'_4=3L_2=9L_{desired}$. Since $L'_2$ is a duplicate of $L'_3$, one can keep original $L_2$ or $L_1$, and discard $L'_2$. Hence, one possible design is to choose the gauge lengths can be implemented by the following series:

$$L_k = 2^n \cdot 3^m \cdot L_{desired}, \quad (10)$$

where m and n are non-negative integers, and $|m-n|\leq 2$. $L_k$ is in an ascending order, and $L_k \geq L_{hardware}$. The design in equation (10) provides a good bandwidth for prediction and restoration of gauge length effect, and relatively large gauge length for high SNR during the prediction and gauge length removal.

The above scheme is an example, and the actual design may vary depending on the on-site need, and variation of situations, for example, $L_1$ and $L_2$ might not be exactly twice and thrice of $L_{desired}$. Certain variations of designed gauge length can be tolerated as long as the abovementioned three criteria are satisfied.

In various embodiments, systems and methods can be implement an approach for removing gauge length effect and predicting wavefields of arbitrary gauge length. These methods are derived from the theoretical expression of gauge length effect. It has the capability to handle field data which contains certain level of noise. These systems and methods also provide important guidance for designing the gauge length for interrogators to ensure good quality, including high SNR and broad bandwidth, of the acquired data.

In various embodiments, an approach can be implemented to convert DAS VSP wavefields of certain gauge length to wavefields of integer multiples of that gauge length used to acquire the data. For instance, from a recorded wavefield of gauge length 10 meters, wavefields of gauge length 20 meters, 30 meters, 40 meters and so forth can be predicted. A DAS VSP wavefield is normally recorded and sample with n traces (or channels) and m time samples per trace, i.e. a m×n matrix. In contrast to conventional seismic acquisition systems, for example, geophones and hydrophones, which measure particle velocity, acceleration, or pressure, DAS measures the strain (strain rate) of an optic fiber in response to impinging seismic waves. Strain with respect to an optical fiber is defined as the ratio of the extension to the original length of a certain optical fiber section and thus it is different in nature from point measurement. Such length of an optical fiber section is referred to as the gauge length. It basically performs a spatial stacking or a boxcar filtering to the gauge length-free data. Receiver levels are then defined at the center of the fiber section spanned by the gauge length, with a designated channel or trace spacing, for example, 1 meter.

A setup of an example DAS system is illustrated in FIG. 3 where the above definitions are graphically annotated. In such a system, the recorded data are subjected to a pre-determined gauge length L during the acquisition or in the on-site or off-site processing flow. The DAS VSP wavefields can be herein denoted as $D_L(t, x) \in \mathbb{R}^{m \times n}$, where t and x are temporal and spatial indices, respectively. By conducting a gauge length conversion, a mechanism is provided to offer freedom to balance the bandwidth and signal-to-noise ratio (SNR) of DAS VSP data in order to satisfy different purposes. Wavefields of multiples of known gauge length, where the wavefields of the known gauge length have reasonable quality and contain effective signals, are redundant to record, since they can be easily converted from the wavefield of the known gauge length. The approach is feasible, practical, and straight forward to implement. Hence, the approach can be performed in a preprocessing stage, a post-processing stage, or can be integrated into an embedded acquisition system.

Considering a gauge length-free wavefield G(t, x), where t and x can be sampled continuously or discretely, $D_L(t, x)$, the wavefield with gauge length L applied, can be expressed as follows:

$$D_L(t, x) = \frac{G(t, x - L/2) - G(t, x + L/2)}{L}. \quad (11)$$

Similarly, the wavefields of gauge length l, which are a multiple of L, can be written as:

$$D_l(t, x) = D_{nL}(t, x) = \frac{G(t, x - nL/2) - G(t, x + nL/2)}{nL}, \quad (12)$$

where n is the integer factor, satisfying l=nL. From equation (11) and (12), the relation between the two gauge lengths can be derived as:

$$D_l(t, x) = \sum_{i=-(n-1)/2}^{(n-1)/2} \frac{D_L(t, x + iL)}{n}, \quad (13)$$

where i is an integer if n is odd or a half integer if n is even. From equation (13), one may convert $D_L(t, x)$ to $D_l(t, x)$ as long as x+iL is properly sampled or interpolated. Presuming $D_L(t, x+iL)$ has been sampled or interpolated with a spatial sampling interval $\Delta d$, where x and L are divisible by $\Delta d$, equation (13) can be recast as:

$$D_l(t, k) = \sum_{i=-(n-1)/2}^{(n-1)/2} \frac{D_L(t, k + ik_0)}{n}, \quad (14)$$

where $k=x/\Delta d$ is the channel index and $k_0=L/\Delta d$ is the stride of averaging. Hence, equation (14) indicates that $D_l(t, k)$ is a moving average of $D_L(t, k)$ of from $k-(n-1)k_0/2$ to $k+(n-1)k_0/2$ with stride $k_0$. This is consistent with, yet a special case of, the earlier approach associated with an attenuation factor taught herein, since a moving-average filtering in spatial domain is equivalent to multiplication by a sinc function in the wavenumber domain. However, this approach provides value in its straight forward implementation so that the real-time gauge length conversion becomes available. In addition, this approach can be embedded into a DAS VSP acquisition system.

Figure 18:
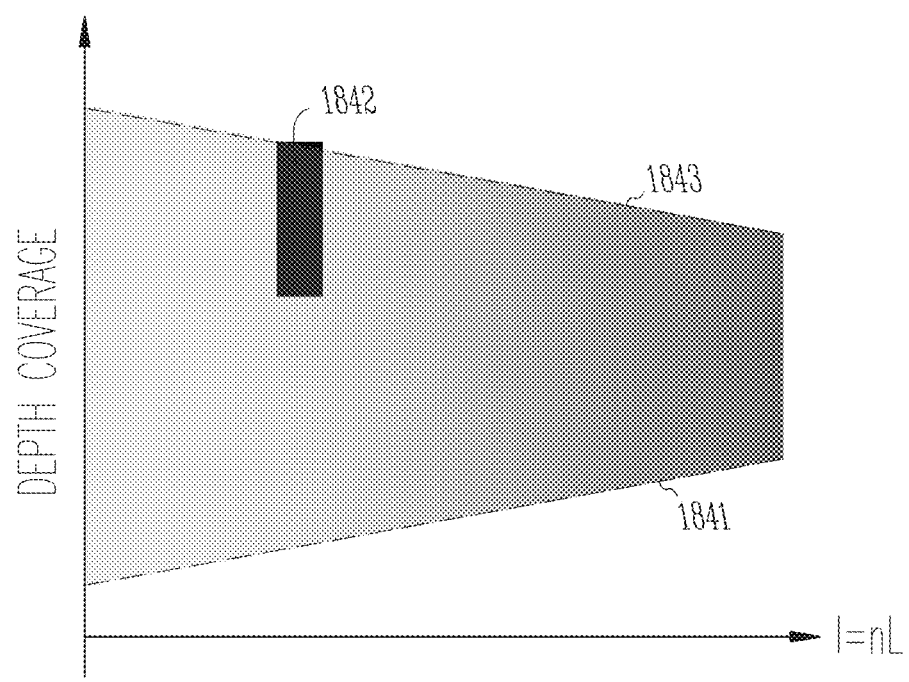
FIG. 18 is a representation of depth of coverage versus gauge length, in accordance with various embodiments.

One minor issue associated with this approach is that the depth coverage of DAS is slightly shrunk with increasing n or target gauge length l, as shown in FIG. 18. FIG. 18 is a representation of depth of coverage versus gauge length. It shows a relationship between the depth coverage of DAS VSP and the gauge length (not drawn to scale). An area 1842 denotes the depth coverage of DAS VSP having a lower bound 1841 and an upper bound 1843. In FIG. 18, the two lines 1841, 1843 have a slope of $\mp\frac{1}{2}$. Since the scale of the gauge length, which normally is less than 40 meters, is far smaller than the scale of the depth coverage, which normally ranges from 500 meters to 3000 meters in common practices, one may bare or omit such little loss of depth coverage against the benefit obtained from this approach.

In various embodiments, equation (13) and equation (14) can be used for gauge length conversion. To demonstrate its effectiveness, this approach was tested on a synthetic DAS VSP data example. The DAS VSP datasets of gauge length of 10 meters and gauge length of 20 meters were synthesized from the same synthetic continuous data stream. Note that the technique, regarding attenuation factor discussed herein, is able to predict wavefields of arbitrary gauge length. Hence, with respect to testing this approach, wavefields of gauge length 20 meters that are recorded and that are predicted using both approaches from wavefields of 10-meter gauge length are compared.

Figure 19A:
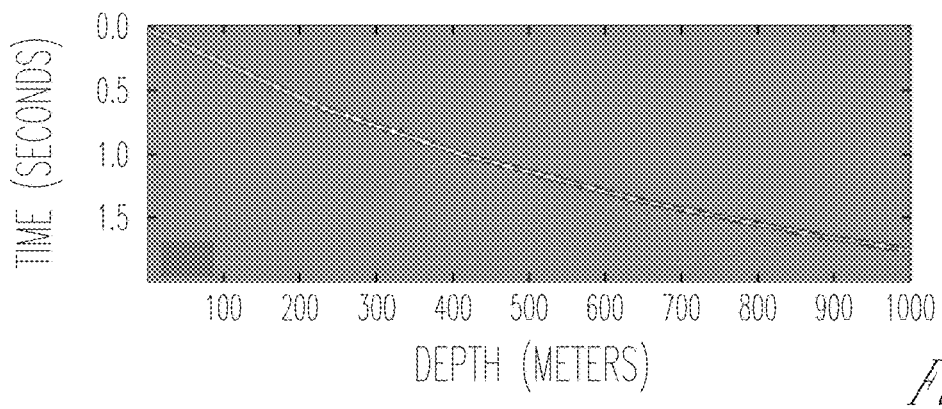
FIGS. 19A-19D are examples of distributed acoustic sensing vertical seismic profiling wavefields acquired by using different gauge lengths over time and depth, in accordance with various embodiments.
Figure 19B:
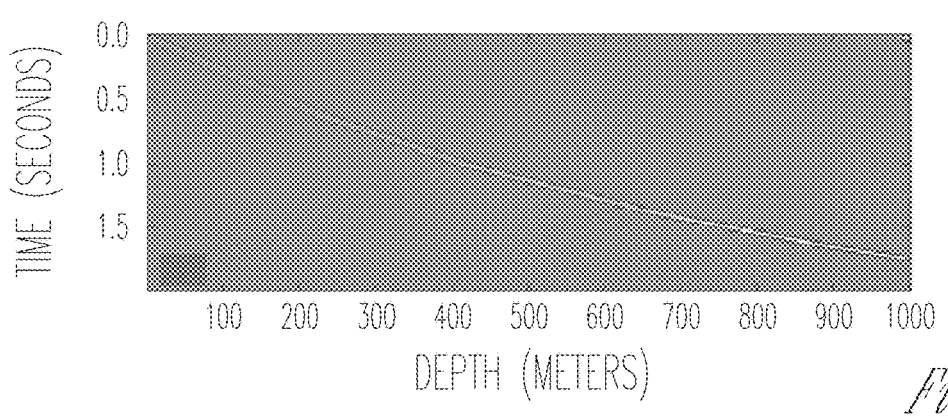
Figure 19C:
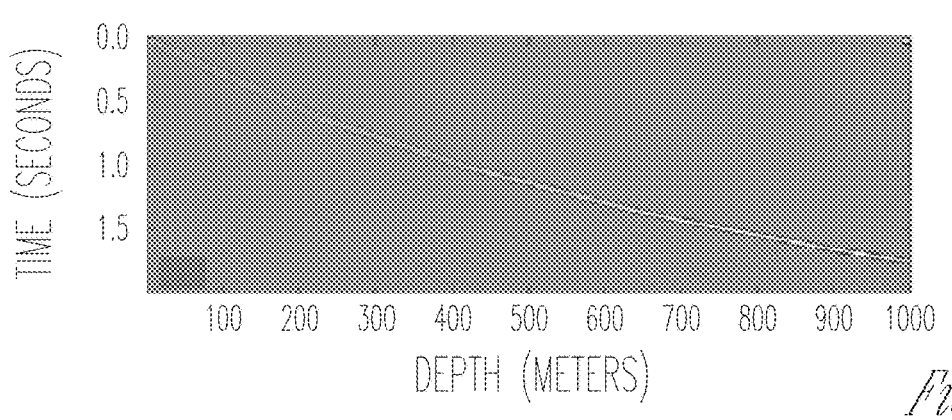
Figure 19D:
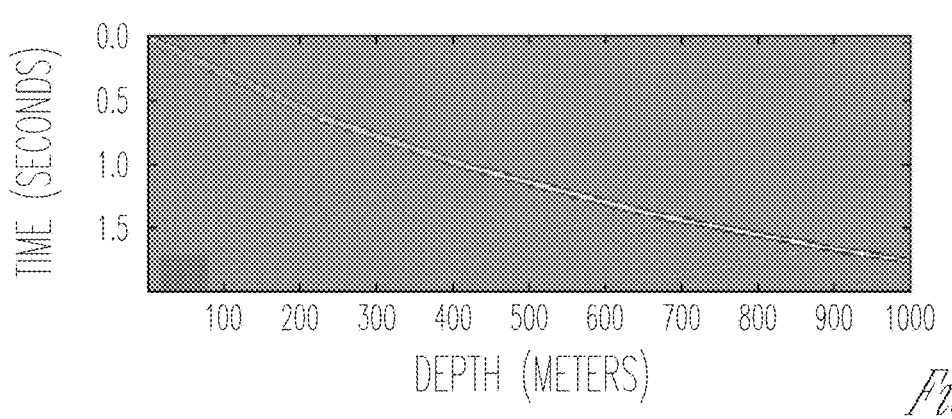
Figure 20A:
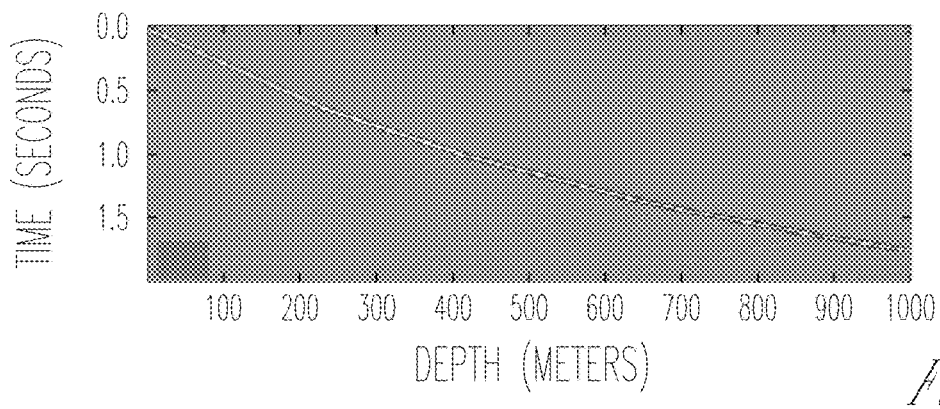
FIGS. 20A-20D are examples of distributed acoustic sensing vertical seismic profiling data with respect to the distributed acoustic sensing vertical seismic profiling data of FIGS. 19A-19D, in accordance with various embodiments.
Figure 20B:
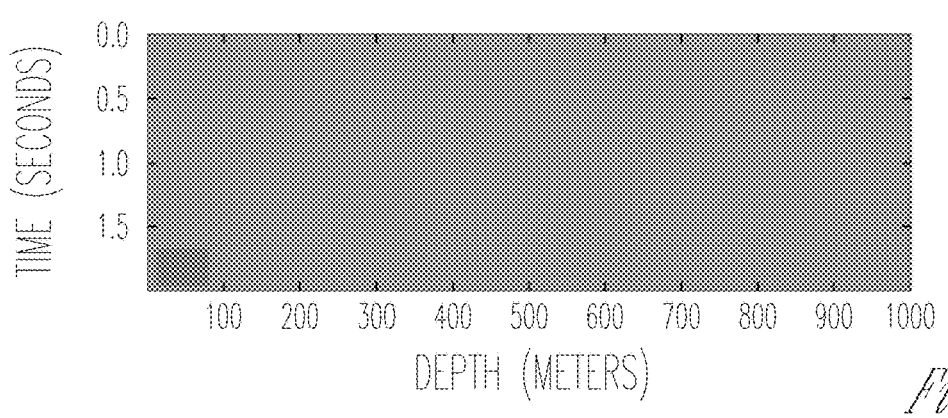
Figure 20C:
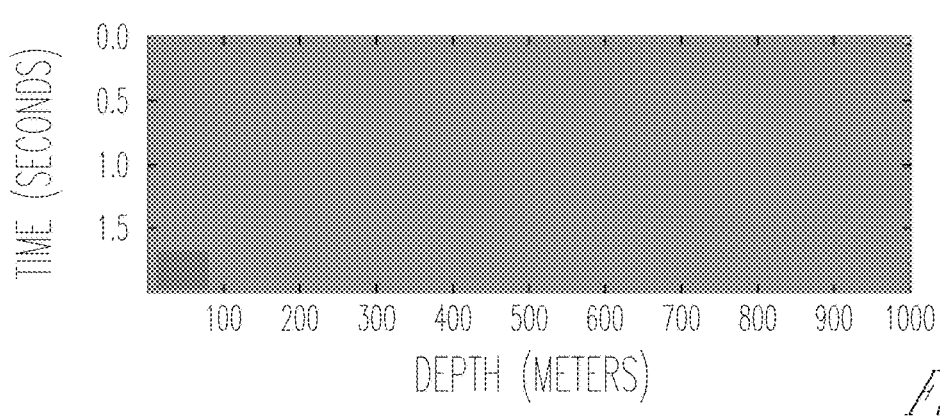
Figure 20D:
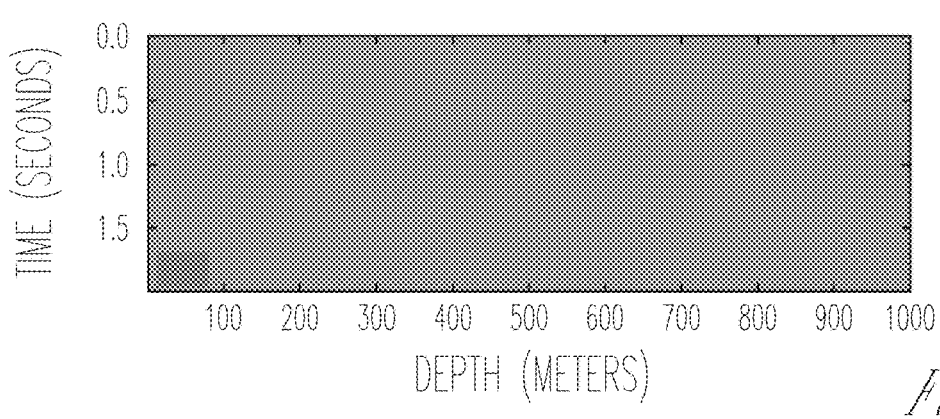
Figure 21A:
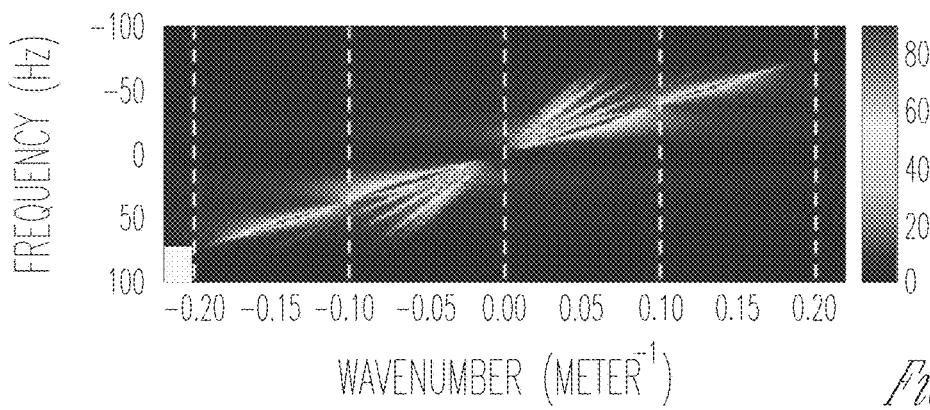
FIGS. 21A-21D are images of frequency-wavenumber spectra corresponding to FIGS. 19A-19D, respectively, in accordance with various embodiments.
Figure 21B:
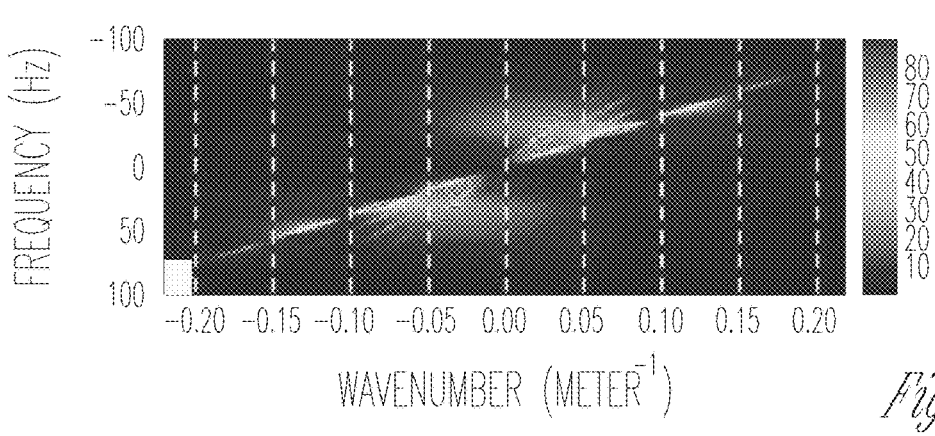
Figure 21C:
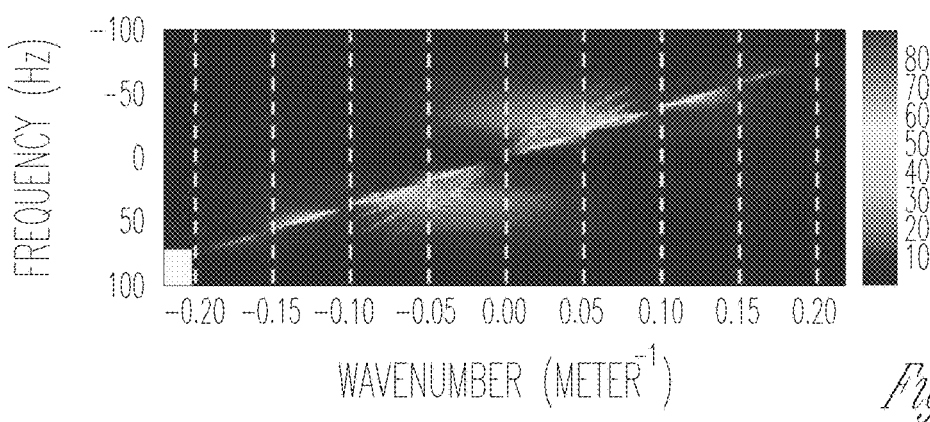
Figure 21D:
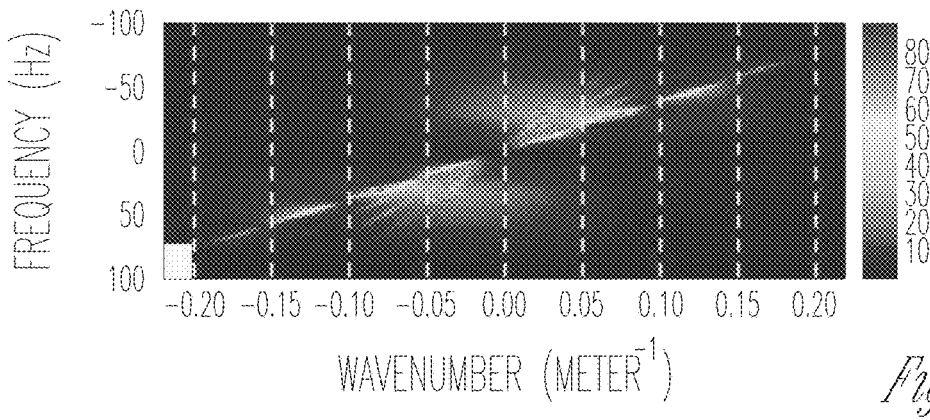

The comparison is shown in FIGS. 19A-22D. FIGS. 19A-19D are examples of DAS VSP wavefields acquired by using different gauge lengths over time and depth. FIGS. 19A and 19B are recapped from FIGS. 2B and 2C. FIG. 19A is an image of synthetic DAS VSP data of gauge length of 10 meters. FIG. 19B is an image of synthetic DAS VSP data of gauge length of 20 meters from the same continuous data stream as that of FIG. 19A. FIG. 19C is an image of predicted DAS VSP data of gauge length of 20 meters from that of gauge length of 10 meters using approach associated with attenuation factor. FIG. 19D is an image of predicted DAS VSP data of 20-meter gauge length from that of 10-meter gauge length using a gauge conversion approach associated using multiple of a gauge length. FIGS. 20A-20D are examples of DAS VSP data with respect to the DAS VSP data of FIGS. 19A-19D. FIG. 20A is an image of synthetic DAS VSP data of gauge length of 20 meters. FIG. 20B is an image of the difference between FIG. 20A and FIG. 19C. FIG. 20C is an image of the difference between FIG. 20A and FIG. 19D. FIG. 20D is an image of the difference between FIG. 19C and FIG. 19D. FIGS. 21A-21D are images of frequency-wavenumber (F-K) spectra corresponding to FIGS. 19A-19D, respectively. FIGS. 22A-22D are images of frequency-wavenumber (F-K) spectra corresponding to FIGS. 20A-20D, respectively.

Figure 22A:
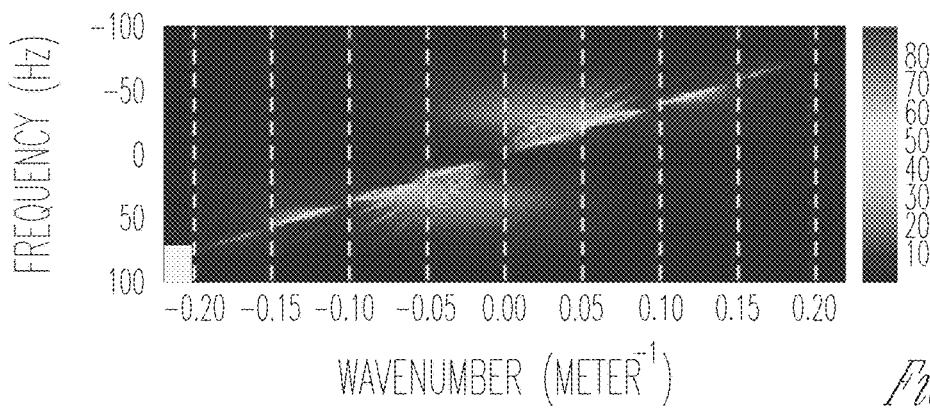
FIGS. 22A-22D are images of frequency-wavenumber spectra corresponding to FIGS. 20A-20D, in accordance with various embodiments.
Figure 22B:
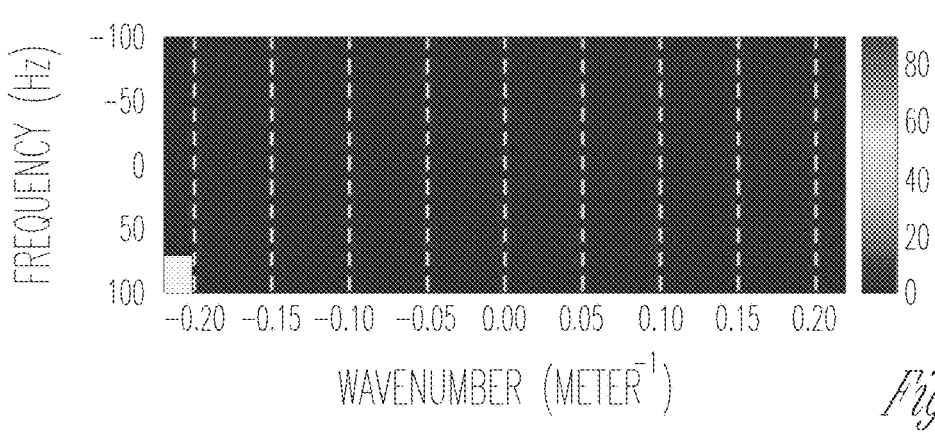
Figure 22C:
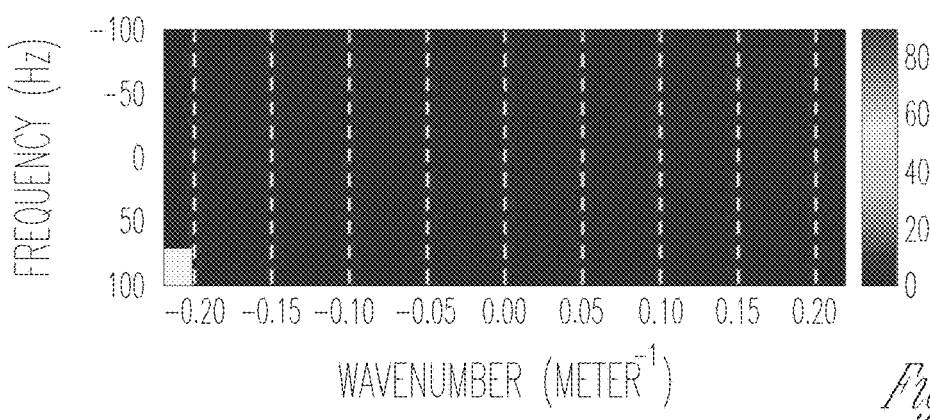
Figure 22D:
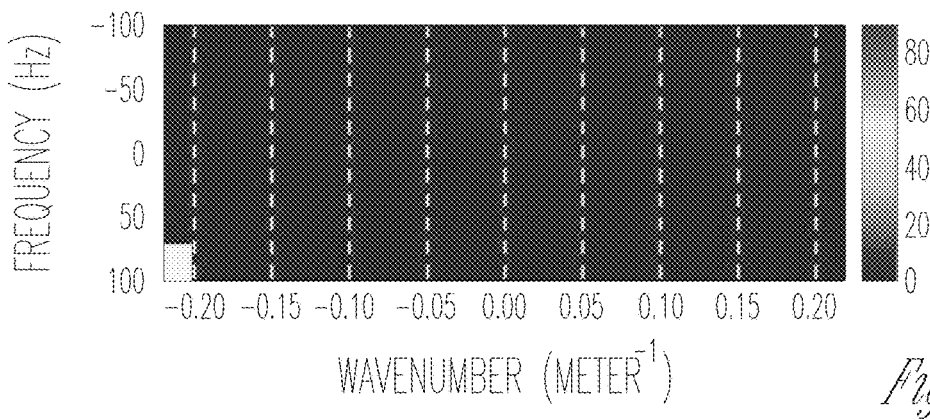

With respect to images in FIGS. 19A-22D, the events, for example, first breaks, reflection and refractions, are sharper for VSP of gauge length of 10 meters. According to theories in equation (13) and equation (14), random noise can be reduced by a rate of $\sqrt{n}$, but the coherent noise would likely be preserved, amplified or spread out during the gauge length manipulation depending on the features of the noise. For instance, residual common-mode noise is preserved during the process, and spiky faded traces will spread out instead. The DAS VSP data of gauge length of 20 meters can be predicted using the two approaches from that of gauge length of 10 meters (FIG. 19A, as shown in FIGS. 19C-19D). A visible difference between FIGS. 19C-19D is not observed. The corresponding difference plots in FIGS. 20 (b), (c) and (d) more clearly support the above observation. Examine the spectra of the wavefields of FIGS. 19A-19D and FIGS. 20A-20D, shown in FIGS. 21A-21D and FIGS. 22A-22D. The vertical dashed lines in FIGS. 21A-21D and FIGS. 22A-22D indicate the zeros caused by the gauge length effect (see equation 1). Comparing the F-K spectra of wavefields of two gauge lengths, there is almost no attenuation along the wavenumber (K) direction for the wavefield of gauge length of 20 meters. Even if there is attenuation of energy as encountered in field trials, such attenuation does not cause any significant loss of signals as long as the dominant energy is located within the first zeros of the F-K spectra for both gauge lengths. The energy in F-K spectra is more aggregated so that no visible difference could be seen from FIGS. 21B, 21C, and 21D. The difference plots in FIGS. 22B-22D reveal no difference between the recorded and predicted wavefields of gauge length of 20 meters. FIG. 22D shows the consistent results predicted by the two approaches as no difference can be seen in the difference plot.

Therefore, it has been verified from the synthetic example above that the approach, as depicted in equation (13) and equation (14), by averaging a certain range of traces with a given stride is feasible and highly effective in converting a wavefield of certain gauge length to that of gauge lengths which are multiples of that gauge length. The approach has been compared to the approach associated with attenuation factor taught herein, and the consistent results provided by the two approaches confirm its validity. Different from the approach associated with attenuation factor, this approach associated with generation of a gauge length as a multiple of a given gauge length engages minimal amount of computation, and could be straightforwardly exploited in real-time acquisition and processing system. Moreover, it indicates that it is not necessary to record DAS VSP data of a gauge length that is a multiple of a recorded one. In other words, operations in the field survey only need to acquire, under the hardware constraints (for example, trace fading rate, noise level, and pulse width of laser beams), DAS VSP data with relatively small gauge lengths, which are not multiples of one another.

In various embodiments, systems and techniques provide an approach for converting DAS VSP data of certain gauge length to that of integer multiples of that gauge length. This technique can be generated from a derivation of the theoretical relation between the wavefields of two divisible gauge lengths, starting from the primary definition of gauge length. Such an approach has the capability to handle field data that contains certain level of noise. These techniques for converting DAS VSP data of certain gauge length to that of integer multiples of that gauge length also provides important guidance for eliminating the need to make recordings using many gauge lengths, so that the design of preset gauge lengths in interrogator boxes can be further refined in order to achieve the most cost-effective operation scheme, while maintaining the quality of acquired field DAS VSP data.

Figure 23:
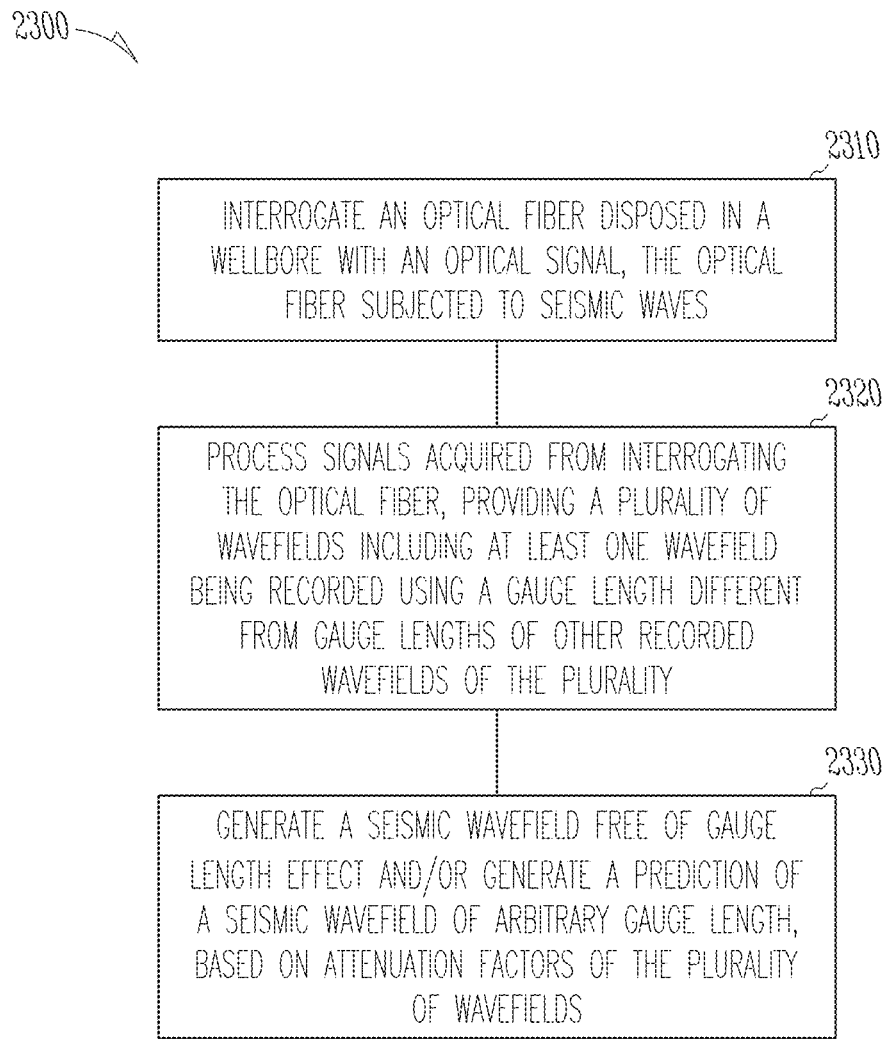
FIG. 23 is a flow diagram of features of an example method that takes into account the effect of gauge length in optical measurements, in accordance with various embodiments.

FIG. 23 is a flow diagram of features of an embodiment of an example method 2300 that takes into account the effect of gauge length in optical measurements. At 2310, an optical fiber disposed in a wellbore is interrogated with an optical signal, where the optical fiber subjected to seismic waves. At 2320, signals acquired from interrogating the optical fiber are processed, providing a plurality of wavefields including at least one wavefield being recorded using a gauge length different from gauge lengths of other recorded wavefields of the plurality.

At 2330, a seismic wavefield free of gauge length effect is generated and/or prediction of a seismic wavefield of arbitrary gauge length is generated, based on attenuation factors of the plurality of wavefields. Such generation can be performed based on attenuation factors of the plurality of wavefields and application of a low pass filter in wavenumber domain, the low pass filter having a cut-off wavenumber with the cut-off wavenumber being less than or equal to one divided by the greatest common divisor of the gauge lengths of the plurality of wavefields. The greatest common divisor can be less than or equal to a lower limit of phase velocity of the seismic waves divided by an upper frequency of the seismic waves. A lower limit of the gauge lengths can be restrained by hardware design.

Variations of method 2300 or methods similar to method 2300 can include a number of different embodiments that may or may not be combined depending on the application of such methods and/or the architecture of systems in which such methods are implemented. Such methods can include the attenuation factors of the wavefields of different gauge lengths having substantially evenly distributed zeros. The different gauge lengths can be selected according to $L_k = 2^n \cdot 3^m \cdot L_{desired}$, where $L_k$ is the $k^{th}$ gauge length, m and n are non-negative integers, $|m-n| \leq 2$, $L_k$ is greater than or equal to a gauge length corresponding to hardware, and $L_{desired}$ is greatest common divisor for the different gauge lengths.

Variations of method 2300 or methods similar to method 2300 can include the gauge length effect being an attenuation factor computed in the wavenumber domain in accordance with $$A(k, l) = \mathrm{sinc}(kl)$$

where $$\mathrm{sinc}(kl) = \frac{\sin(\pi kl)}{\pi kl},$$

k is the wavenumber, and l is the gauge length. Generating the seismic wavefield free of gauge length effect can include processing, in the wavenumber domain, the attenuation factors, the plurality of wavefields, and the application of the low pass filter in accordance with $$\tilde{d}(t, k) = \tilde{f}_{k_{uplim}}(k) \cdot \frac{\sum_{\{l\}} \mathrm{sgn}(A(k, l)) * \tilde{D}_l(t, k)}{\sum_{\{l\}} |A(k, l)|},$$

where $\tilde{d}(t, k)$ is a one dimensional Fourier transform of d(t, x) along the space direction (x axis) with d(t, x) being the seismic wavefield free of gauge length effect in a spatial domain with respect to time t and distance x, $\tilde{D}_l(t, k)$ is the is the Fourier transform of $D_l(t, x)$ with $D_l(t, x)$ being a seismic wavefield of the gauge length l in spatial domain, sgn(•) is the sign function, and |•| is an absolute value operator, $\Sigma_{\{l\}}$ is a summation over the different gauge lengths, $\tilde{f}_{k_{uplim}}(k)$ is the low pass filter in wavenumber domain, and A(k, l) is the attenuation factor of gauge length l in wavenumber domain. Generating the prediction of the seismic wavefield of arbitrary gauge length can include processing, in the wavenumber domain, the attenuation factors, the plurality of wavefields and the application of the low pass filter in accordance with $$\tilde{D}_L(t, k) = \tilde{f}_{k_{uplim}}(k) \cdot A(k, L) \cdot \frac{\Sigma_{\{l\}} \mathrm{sgn}(A(k, l)) * \tilde{D}_l(t, k)}{\Sigma_{\{l\}} |A(k, l)|},$$

where L is an arbitrary gauge length for the wavefield being generated, $\tilde{D}_L(t, k)$ is the Fourier transform of $D_L(t, x)$ with $D_L(t, x)$ being a seismic wavefield of gauge length L in spatial domain with respect to time t and distance x, sgn(•) is the sign function, |•| is an absolute value operator, $\Sigma_{\{l\}}$ is a summation over the different gauge lengths, $\tilde{f}_{k_{uplim}}(k)$ is the low pass filter in wavenumber domain, and A(k, L) is the attenuation factor of gauge length L in wavenumber domain.

Figure 24:
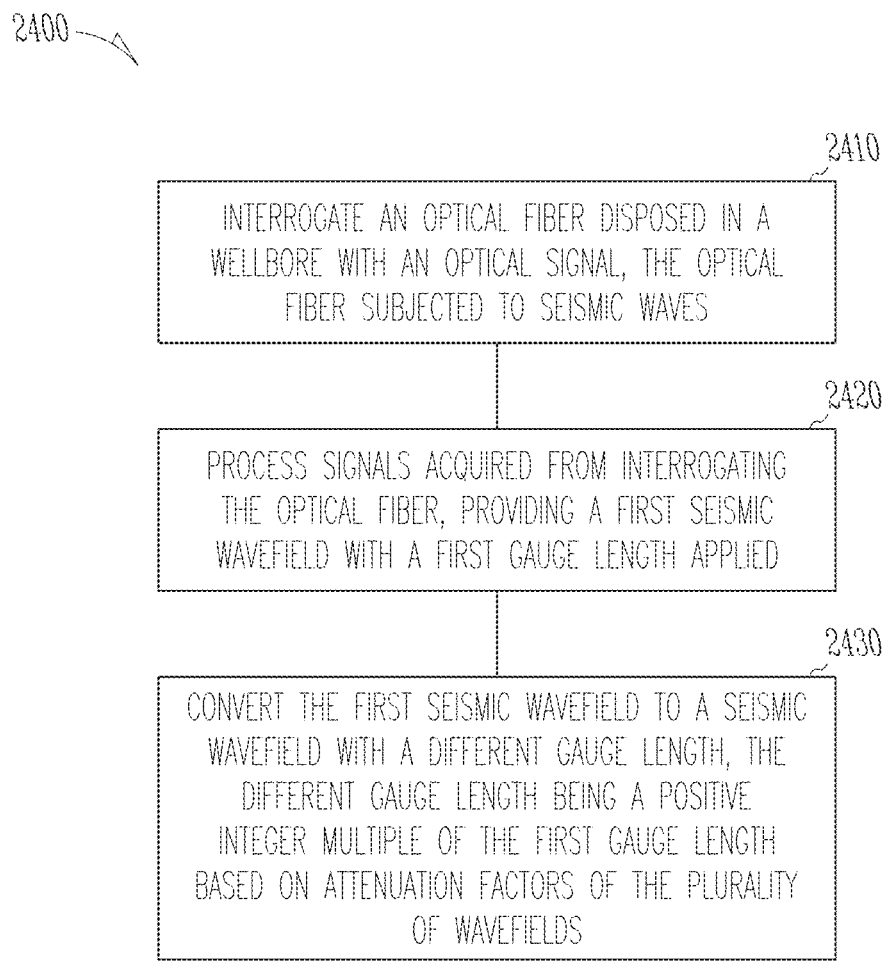
FIG. 24 is a flow diagram of features of an example method that generates a gauge length associated with optical measurements, in accordance with various embodiments.

FIG. 24 is a flow diagram of features of an embodiment of an example method 2400 that generates a gauge length associated with optical measurements. At 2410, an optical fiber disposed in a wellbore is interrogated with an optical signal, where the optical fiber subjected to seismic waves. At 2420, signals acquired from interrogating the optical fiber are processed, providing a first seismic wavefield with a first gauge length applied. At 2430, the first seismic wavefield is converted to a seismic wavefield with a different gauge length, the different gauge length being a positive integer multiple of the first gauge length.

Converting the first seismic wavefield can include generating a moving average of the first seismic wavefield. Converting the first seismic wavefield to the seismic wavefield with the different gauge length can include processing, in the spatial domain, in accordance with $$D_l(t, x) = \sum_{i=-(n-1)/2}^{(n-1)/2} \frac{D_L(t, x + iL)}{n},$$

where $D_l(t, x)$ is seismic wavefield in the spatial domain as a function of time t and distance x with gauge length l, L is the first gauge length, $D_L(t, x+iL)$ is the first seismic wavefield in the spatial domain as a function of time t, distance x, and the first gauge length, n is the positive integer, and i is a summation index that is an integer if n is odd and is a half integer if n is even. Converting the first seismic wavefield to the seismic wavefield with the different gauge length can include processing, in the channel number/discretized spatial domain, in accordance with $$D_l(t, k) = \sum_{i=-(n-1)/2}^{(n-1)/2} \frac{D_L(t, k + ik_0)}{n},$$

where $D_l(t, k)$ is seismic wavefield in channel number/discretized spatial domain as a function of time t and channel index k with gauge length l, L is the first gauge length, $D_L(t, k+ik_0)$ is the first seismic wavefield in the wavenumber domain as a function of time and channel index k with gauge length L, n is the positive integer, and i is a summation index that is an integer if n is odd and is a half integer if n is even, $k=x/\Delta d$ is a channel index with $\Delta d$ being a spatial sampling interval such that x and L are divisible by $\Delta d$, and $k_0 = L/\Delta d$.

In various embodiments, a non-transitory machine-readable storage device can comprise instructions stored thereon, which, when performed by a machine, cause the machine to perform operations, the operations comprising one or more features similar to or identical to features of methods and techniques described with respect to method 2300, method 2400, variations thereof, and/or features of other methods taught herein such as associated with FIGS. 1-22. The physical structures of such instructions may be operated on by one or more processors. For example, executing these physical structures can cause the machine to perform operations comprising: interrogating an optical fiber disposed in a wellbore with an optical signal, the optical fiber subjected to seismic waves; processing signals acquired from interrogating the optical fiber, providing a plurality of wavefields including at least one wavefield being recorded using a gauge length different from gauge lengths of other recorded wavefields of the plurality; and generating a seismic wavefield free of gauge length effect and/or generating a prediction of a seismic wavefield of arbitrary gauge length, based on attenuation factors of the plurality of wavefields and application of a low pass filter in wavenumber domain, the low pass filter having a cut-off wavenumber, the cut-off wavenumber being less than or equal to one divided by the greatest common divisor of the gauge lengths of the plurality of wavefields.

The non-transitory machine-readable storage device can comprise instructions stored thereon to perform additional operations or alternative operations, for example, these operations can comprise: interrogating an optical fiber disposed in a wellbore with an optical signal, the optical fiber subjected to seismic waves; processing signals acquired from interrogating the optical fiber, providing a first seismic wavefield with a first gauge length applied; and converting the first seismic wavefield to a seismic wavefield with a different gauge length, the different gauge length being a positive integer multiple of the first gauge length.

Execution of various instructions may be realized by the control circuitry of the machine to execute one or more features similar to or identical to features of methods and techniques described with respect to method 2300, method 2400, variations thereof, and/or features of other methods taught herein such as associated with FIGS. 1-25. For example, the instructions can include instructions to operate a tool or tools having a laser generator and interrogator disposed with respect to an optical fiber in a wellbore to provide data to process in accordance with the teachings herein.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory 2535 of FIG. 25. While memory 2535 is shown as a single unit, terms such as "memory," "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory," "memory module," "machine-readable medium," and "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device,"

or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 25:
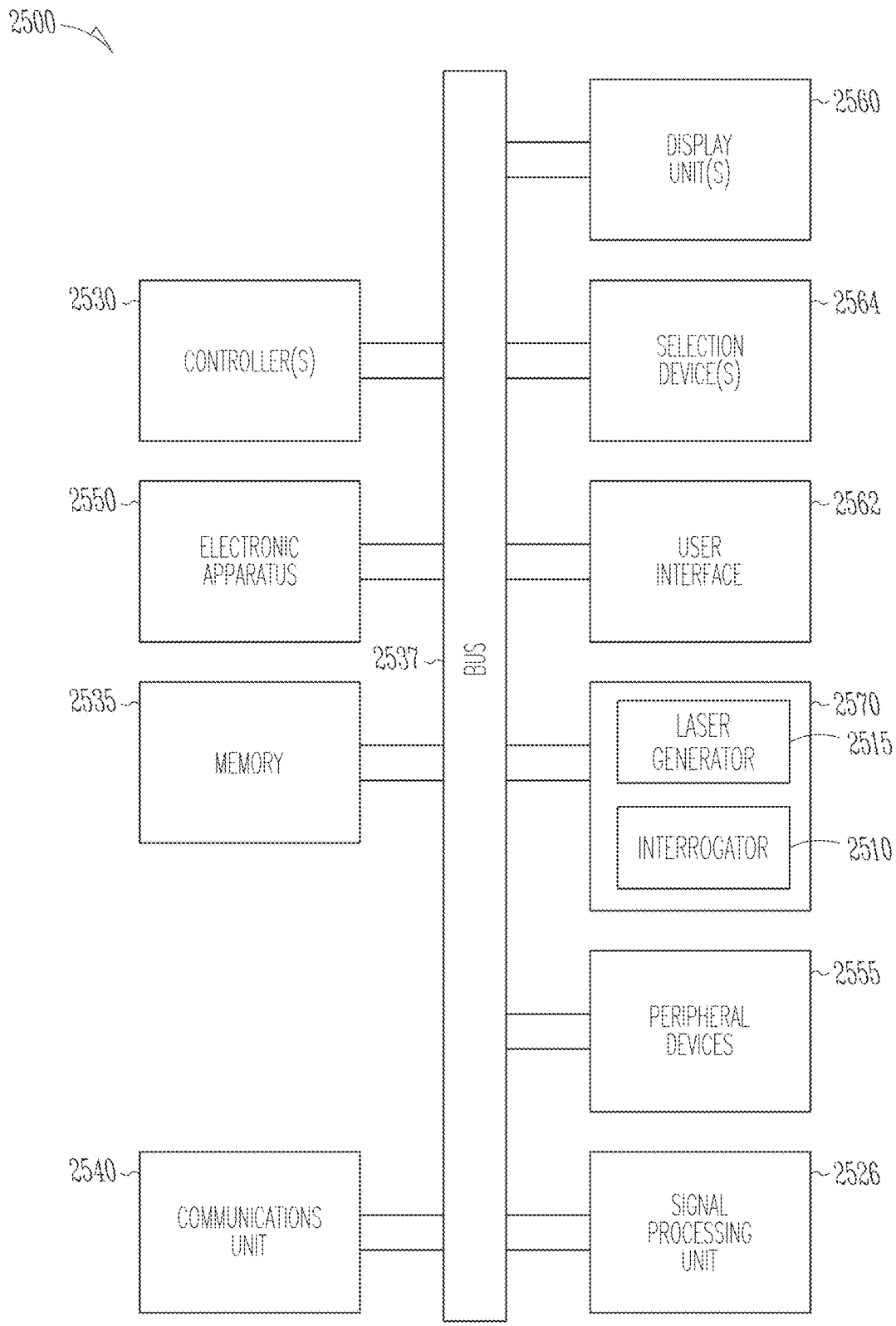
FIG. 25 is a block diagram of features of an example system operable to execute schemes associated with gauge length effect and gauge length conversion with respect to optical measurements in a wellbore, in accordance with various embodiments.

FIG. 25 is a block diagram of features of an embodiment of an example system 2500 operable to execute schemes associated with gauge length effect and gauge length conversion with respect to optical measurements in a wellbore. The system 2500 can comprise instrumentality as taught herein, for example, in accordance with embodiments described with respect to FIGS. 1 and 3 or similar arrangements and their operation as taught herein.

The system 2500 can comprise a controller(s) 2530 and a tool 2570, where the tool 2570 has one or more laser generators 2515 and one or more interrogators 2510. The controller(s) 2530 can be arranged to control the one or more laser generators 2515 and the one or more interrogators 2510. The controller(s) 2530 can be arranged to process data from optical signals received by the interrogator 2510, where the optical signals are from regions of the wellbore, in response to optical signals coupled into an optical fiber by the laser generator(s) 2515 with the optical fiber disposed in the wellbore generated to determine status of structures and material within the wellbore and/or the formation around the wellbore. The controller(s) 2530 can be operable to process optical signals in accordance with features of features similar to or identical to features of methods and techniques described with respect to method 2300, method 2400, variations thereof, and/or features of other methods taught herein such as associated with FIGS. 1-24. The controller(s) 2530 can be realized as one or more processors. The controller(s) 2530 can be arranged as a single processor or a group of processors. Processors of the group of processors may operate independently depending on an assigned function. The controller(s) 2530 can be realized as one or more application-specific integrated circuits (ASICs). The controller(s) 2530 can be realized as control circuitry to manage the components of system 2500.

The interrogator 2510 can be realized by different optical sensors and/or optical processing devices. For example, the interrogator can include one of more interferometric systems. The laser generator(s) 2515 can include one or more lasers. The one or more lasers may be operable at selected laser frequencies.

The system 2500 can include a user interface 2562 operable with the controller(s) 2530, a signal processing unit 2526 operable with the user interface 2562, where the controller(s) 2530, the user interface 2562, and the signal processing unit 2526 can be structured to be operated according to any scheme similar to or identical to the schemes associated with gauge length effect and gauge length conversion with respect to optical measurements in a wellbore as taught herein. The system 2500 can be arranged as a distributed system.

The system 2500 can include a memory 2535, an electronic apparatus 2550, and a communications unit 2540. The controller(s) 2530, the memory 2535, and the communications unit 2540 can be arranged to operate as a signal processing unit to control investigation of a wellbore, pipe structure in the wellbore, material in the wellbore, and formation around the wellbore. The memory 2535 can be realized as a memory module, which may include a set of memory devices and access devices to interface with the set of memory devices. The memory 2535 can include a database having information and other data such that the system 2500 can operate on data to control the laser generator(s) 2515 and the interrogator 2510. In an embodiment, the signal processing unit 2526 can be distributed among the components of the system 2500 including memory 2535 and/or the electronic apparatus 2550. Alternatively, the signal processing unit 2526 can be arranged as an independent system having its own processor(s) and memory. The electronic apparatus 2550 can include drivers to provide voltage and/or current input to components of the system 2500. For example, the electronic apparatus 2550 can include drivers of optical sources, such as lasers and can include electronic circuitry for optical detectors and interferometric devices associated with optical fiber receiver arrangements.

The communications unit 2540 may use combinations of wired communication technologies and wireless technologies at appropriate frequencies. The communications unit 2540 can allow for a portion or all of data analysis regarding the status of the multi-string pipe structure and associated material in annuli around the pipes to be provided to the user interface 2562 for presentation on the one or more display unit(s) 2560 aboveground. The communications unit 2540 can allow for transmission of commands to downhole components in response to signals provided by a user through the user interface 2562.

The system 2500 can also include a bus 2537, where the bus 2537 provides electrical conductivity among the components of the system 2500. The bus 2537 can include an address bus, a data bus, and a control bus, each independently configured. The bus 2537 can be realized using a number of different communication mediums that allows for the distribution of components of the system 2500. Use of the bus 2537 can be regulated by the controller(s) 2530. The bus 2537 can include a communications network to transmit and receive signals including data signals and command and control signals. In a distributed architecture, the bus 2537 may be part of a communications network.

In various embodiments, peripheral devices 2555 can include additional storage memory and/or other control devices that may operate in conjunction with the controllers(s) 2530 and/or the memory 2535. The display unit(s) 2560 can be arranged with a screen display as a distributed component that can be used with instructions stored in the memory 2535 to implement the user interface 2562 to manage the operation of the tool 2570 and/or components distributed within the system 2500. Such a user interface can be operated in conjunction with the communications unit 2540 and the bus 2537. The display unit(s) 2560 can include a video screen, a printing device, or other structure to visually project data/information and images. The system 2500 can include a number of selection devices 2564 operable with the user interface 2562 to provide user inputs to operate the signal processing unit 2526 or its equivalent. The selection device(s) 2564 can include one or more of a touch screen, a computer mouse, or other control device operable with the user interface 2562 to provide user inputs to operate the signal processing unit 2526 or other components of the system 2500.

Compared to existing gauge length studies, the techniques, as taught herein, firstly derive the gauge length from the theoretical point of view, but are not data driven. These techniques are able to precisely restore gauge length-free wavefields, to predict any wavefields of desired gauge length, and to precisely predict the wavefields of the gauge length which is a multiple of a known gauge length. Such techniques can also be performed in real time, and can be integrated into an interrogator for real-time high quality data acquisition. The design is flexible to fit the designs of gauge length within the hardware constraints.

To avoid on-site tuning in order to achieve better SNR and high resolution/sharpened waveforms of data, gauge lengths should be designed and validated before survey. Subject to contemporary hardware constraints, theoretically derived optimal gauge length might sometimes not be fit into the hardware. Techniques as taught herein are able to provide flexibility of gauge length design so that the designed gauge length can be within the hardware constraints while still maintaining good SNR and broad bandwidth. By designing the gauge lengths before field acquisition using the approach as taught herein, significant time loss and cost can be reduced, and the risk of having bad data is much lowered.

The techniques as taught herein can be applied to any DAS VSP survey configuration and any source types. These techniques can be used to predict wavefields of arbitrary gauge length, to remove gauge length effect from the recorded wavefields, to predict wavefields of multiples of known gauge lengths. These techniques can be used to design the gauge lengths for DAS interrogator units. The choices/design of gauge lengths that should be preset in interrogator units in a DAS VSP acquisition system can be further refined. Depending on the number of vacancies of gauge length, reasonably good gauge length values can be set up and embedded in the DAS acquisition system. These techniques can realize gauge length effect prediction and removal that can be applied in real time and/or gauge length conversion that can be applied in real time. One or more of these techniques for removing gauge length effect, for predicting wavefields of arbitrary gauge lengths, and for gauge length conversion disclosed herein can be augmented with other independent processing algorithms/workflows that further enhance the SNR. These techniques can enable data delivery during or immediately following a DAS VSP survey with high SNR and broad bandwidth. These techniques can be applied to temporal (wireline) or permanent DAS systems. These techniques can be applied to DAS VSP surveys in either offshore or onshore wells. The guidance provided herein is sufficiently flexible to fit into other gauge length designs, and the refined design can be within hardware constraints. The results of the DAS VSP surveys can be used to direct and/or control gas and/or oil production activities and/or direct and/or control of mitigation of problems at a well site identified by the results of the DAS VSP surveys.

The following are example embodiments of methods, systems, and machine readable storage devices, in accordance with the teachings herein.

A method 1 can comprise: interrogating an optical fiber disposed in a wellbore with an optical signal, the optical fiber subjected to seismic waves; processing signals acquired from interrogating the optical fiber, providing a plurality of wavefields including at least one wavefield being recorded using a gauge length different from gauge lengths of other recorded wavefields of the plurality; and generating a seismic wavefield free of gauge length effect and/or generating a prediction of a seismic wavefield of arbitrary gauge length, based on attenuation factors of the plurality of wavefields and application of a low pass filter in wavenumber domain, the low pass filter having a cut-off wavenumber, the cut-off wavenumber being less than or equal to one divided by the greatest common divisor of the gauge lengths of the plurality of wavefields.

A method 2 can include elements of method 1 and can include the greatest common divisor being less than or equal to a lower limit of phase velocity of the seismic waves divided by an upper frequency of the seismic waves.

A method 3 can include elements of any of methods 1 and 2 and can include a lower limit of the gauge lengths being restrained by hardware design.

A method 4 can include elements of any of methods 1-3 and can include the attenuation factors of the wavefields of different gauge lengths having substantially evenly distributed zeros.

A method 5 can include elements of method 4 and elements of any of methods 1-3 and can include the different gauge lengths being selected according to $L_k = 2^n \cdot 3^m \cdot L_{desired}$ where $L_k$ is the kth gauge length, m and n are non-negative integers, $|m-n| \leq 2$, $L_k$ is greater than or equal to a gauge length corresponding to hardware, and $L_{desired}$ is greatest common divisor for the different gauge lengths.

A method 6 can include elements of any of methods 1-5 and can include the gauge length effect being an attenuation factor computed in the wavenumber domain in accordance with $$A(k, l) = \mathrm{sinc}(kl)$$

where $$\mathrm{sinc}(kl) = \frac{\sin(\pi kl)}{\pi kl},$$

k is the wavenumber, and l is the gauge length.

A method 7 can include elements of method 6 and elements of any of methods 1-5 and can include generating the seismic wavefield free of gauge length effect to include processing, in the wavenumber domain, the attenuation factors, the plurality of wavefields, and the application of the low pass filter in accordance with $$\tilde{d}(t, k) = \tilde{f}_{k_{uplim}}(k) \cdot \frac{\sum_{\{l\}} \mathrm{sgn}(A(k, l)) * \tilde{D}_l(t, k)}{\sum_{\{l\}} |A(k, l)|},$$

where $\tilde{d}(t, k)$ is a one dimensional Fourier transform of d(t, x) along the space direction (x axis) with d(t, x) being the seismic wavefield free of gauge length effect in a spatial domain with respect to time t and distance x, $\tilde{D}_l(t, k)$ is the is the Fourier transform of $D_l(t, x)$ with $D_l(t, x)$ being a seismic wavefield of the gauge length l in spatial domain, sgn(•) is the sign function, and |•| is an absolute value operator, $\sum_{\{l\}}$ is a summation over the different gauge lengths, $\tilde{f}_{k_{uplim}}(k)$ is the low pass filter in wavenumber domain, and A(k, l) is the attenuation factor of gauge length l in wavenumber domain.

A method 8 can include elements of method 6 and elements of any of methods 1-5 and 7 and can include generating the prediction of the seismic wavefield of arbitrary gauge length to include processing, in the wavenumber domain, the attenuation factors, the plurality of wavefields and the application of the low pass filter in accordance with $$\tilde{D}_L(t, k) = \tilde{f}_{k_{uplim}}(k) \cdot A(k, L) \cdot \frac{\sum_{\{l\}} \mathrm{sgn}(A(k, l)) * \tilde{D}_l(t, k)}{\sum_{\{l\}} |A(k, l)|},$$

where L is an arbitrary gauge length for the wavefield being generated, $\tilde{D}_L(t, k)$ is the Fourier transform of $D_L(t, x)$ with $D_L(t, x)$ being a seismic wavefield of gauge length L in spatial domain with respect to time t and distance x, sgn(•) is the sign function, |•| is an absolute value operator, $\Sigma_{\{l\}}$ is a summation over the different gauge lengths, $\tilde{f}_{k_{uplim}}(k)$ is the low pass filter in wavenumber domain, and A(k, L) is the attenuation factor of gauge length L in wavenumber domain.

A method 9 can comprise: interrogating an optical fiber disposed in a wellbore with an optical signal, the optical fiber subjected to seismic waves; processing signals acquired from interrogating the optical fiber, providing a first seismic wavefield with a first gauge length applied; and converting the first seismic wavefield to a seismic wavefield with a different gauge length, the different gauge length being a positive integer multiple of the first gauge length.

A method 10 can include elements of method 9 and can include converting the first seismic wavefield to include generating a moving average of the first seismic wavefield.

A method 11 can include elements of any of methods 9 and 10 and can include converting the first seismic wavefield to the seismic wavefield with the different gauge length to include processing, in the spatial domain, in accordance with $$D_l(t, x) = \sum_{i=-(n-1)/2}^{(n-1)/2} \frac{D_L(t, x+iL)}{n},$$

where $D_l(t, x)$ is seismic wavefield in the spatial domain as a function of time t and distance x with gauge length l, L is the first gauge length, $D_L(t, x+iL)$ is the first seismic wavefield in the spatial domain as a function of time t, distance x, and the first gauge length, n is the positive integer, and i is a summation index that is an integer if n is odd and is a half integer if n is even.

A method 12 can include elements of any of methods 9-11 and can include converting the first seismic wavefield to the seismic wavefield with the different gauge length to include processing, in the channel number/discretized spatial domain, in accordance with $$D_l(t, k) = \sum_{i=-(n-1)/2}^{(n-1)/2} \frac{D_L(t, k+ik_0)}{n},$$

where $D_l(t, k)$ is seismic wavefield in channel number/discretized spatial domain as a function of time t and channel index k with gauge length l, L is the first gauge length, $D_L(t, k+ik_0)$ is the first seismic wavefield in the wavenumber domain as a function of time and channel index k with gauge length L, n is the positive integer, and i is a summation index that is an integer if n is odd and is a half integer if n is even, $k = x/\Delta d$ is a channel index with $\Delta d$ being a spatial sampling interval such that x and L are divisible by $\Delta d$, and $k_0 = L/\Delta d$.

A machine-readable storage device 1 having instructions stored thereon, which, when executed by the control circuitry of a machine, cause the machine to perform operations, the operations can comprise: interrogating an optical fiber disposed in a wellbore with an optical signal, the optical fiber subjected to seismic waves; processing signals acquired from interrogating the optical fiber, providing a plurality of wavefields including at least one wavefield being recorded using a gauge length different from gauge lengths of other recorded wavefields of the plurality; and generating a seismic wavefield free of gauge length effect and/or generating a prediction of a seismic wavefield of arbitrary gauge length, based on attenuation factors of the plurality of wavefields and application of a low pass filter in wavenumber domain, the low pass filter having a cut-off wavenumber, the cut-off wavenumber being less than or equal to one divided by the greatest common divisor of the gauge lengths of the plurality of wavefields.

A machine-readable storage device 2 can include elements of machine-readable storage device 1 and can include the greatest common divisor being less than or equal to a lower limit of phase velocity of the seismic waves divided by an upper frequency of the seismic waves.

A machine-readable storage device 3 can include elements of any of machine-readable storage devices 1 and 2 and can include a lower limit of the gauge lengths being restrained by hardware design.

A machine-readable storage device 4 can include elements of any of machine-readable storage devices 1-3 and can include the attenuation factors of the wavefields of different gauge lengths having substantially evenly distributed zeros.

A machine-readable storage device 5 can include elements of machine-readable storage device 4 and elements of any of machine-readable storage devices 1-3 and can include the different gauge lengths being selected according to $L_k = 2^n \cdot 3^m \cdot L_{desired}$, where $L_k$ is the kth gauge length, m and n are non-negative integers, $|m-n| \leq 2$, $L_k$ is greater than or equal to a gauge length corresponding to hardware, and $L_{desired}$ is greatest common divisor for the different gauge lengths.

A machine-readable storage device 6 can include elements of any of machine-readable storage devices 1-5 and can include the gauge length effect being an attenuation factor computed in the wavenumber domain in accordance with $$A(k, l) = \mathrm{sinc}(kl)$$

where $$\mathrm{sinc}(kl) = \frac{\sin(\pi kl)}{\pi kl},$$

k is the wavenumber, and l is the gauge length.

A machine-readable storage device 7 can include elements of machine-readable storage device 6 and elements of any of machine-readable storage devices 1-5 and can include generating the seismic wavefield free of gauge length effect to include processing, in the wavenumber domain, the attenuation factors, the plurality of wavefields, and the application of the low pass filter in accordance with $$\tilde{d}(t, k) = \tilde{f}_{k_{uplim}}(k) \cdot \frac{\Sigma_{\{l\}} \mathrm{sgn}(A(k, l)) * \tilde{D}_l(t, k)}{\Sigma_{\{l\}} |A(k, l)|},$$

where $\tilde{d}(t, k)$ is a one dimensional Fourier transform of d(t, x) along the space direction (x axis) with d(t, x) being the seismic wavefield free of gauge length effect in a spatial domain with respect to time t and distance x, $\tilde{D}_l(t, x)$ is the Fourier transform of $D_l(t, x)$ with $D_l(t, x)$ being a seismic wavefield of the gauge length l in spatial domain, sgn(•) is the sign function, and |•| is an absolute value operator, $\Sigma_{\{l\}}$ is a summation over the different gauge lengths, $\tilde{f}_{k_{uplim}}(k)$ is the low pass filter in wavenumber domain, and A(k, l) is the attenuation factor of gauge length l in wavenumber domain.

A machine-readable storage device 8 can include elements of machine-readable storage device 6 and elements of any of machine-readable storage devices 1-5 and 7 and can include generating the prediction of the seismic wavefield of arbitrary gauge length to include processing, in the wavenumber domain, the attenuation factors, the plurality of wavefields and the application of the low pass filter in accordance with $$\tilde{D}_L(t, k) = \tilde{f}_{k_{uplim}}(k) \cdot A(k, L) \cdot \frac{\Sigma_{\{l\}} sgn(A(k, l)) * \tilde{D}_l(t, k)}{\Sigma_{\{l\}} |A(k, l)|},$$

where L is an arbitrary gauge length for the wavefield being generated, $\tilde{D}_L(t, k)$ is the Fourier transform of $D_L(t, x)$ with $D_L(t, x)$ being a seismic wavefield of gauge length L in spatial domain with respect to time t and distance x, sgn(•) is the sign function, |•| is an absolute value operator, $\Sigma_{\{l\}}$ is a summation over the different gauge lengths, $\tilde{f}_{k_{uplim}}(k)$ is the low pass filter in wavenumber domain, and A(k, L) is the attenuation factor of gauge length L in wavenumber domain.

A machine-readable storage device 9 having instructions stored thereon, which, when executed by the control circuitry of a machine, cause the machine to perform operations, the operations can comprise: interrogating an optical fiber disposed in a wellbore with an optical signal, the optical fiber subjected to seismic waves; processing signals acquired from interrogating the optical fiber, providing a first seismic wavefield with a first gauge length applied; and converting the first seismic wavefield to a seismic wavefield with a different gauge length, the different gauge length being a positive integer multiple of the first gauge length.

A machine-readable storage device 10 can include elements of machine-readable storage device 9 and can include converting the first seismic wavefield to include generating a moving average of the first seismic wavefield.

A machine-readable storage device 11 can include elements of any of machine-readable storage devices 9 and 10 and can include converting the first seismic wavefield to the seismic wavefield with the different gauge length to include processing, in the spatial domain, in accordance with $$D_l(t, x) = \sum_{i=-(n-1)/2}^{(n-1)/2} \frac{D_L(t, x + iL)}{n},$$

where $D_l(t, x)$ is seismic wavefield in the spatial domain as a function of time t and distance x with gauge length l, L is the first gauge length, $D_L(t, x+iL)$ is the first seismic wavefield in the spatial domain as a function of time t, distance x, and the first gauge length, n is the positive integer, and i is a summation index that is an integer if n is odd and is a half integer if n is even.

A machine-readable storage device 12 can include elements of any of machine-readable storage devices 9-11 and can include converting the first seismic wavefield to the seismic wavefield with the different gauge length to include processing, in the channel number/discretized spatial domain, in accordance with $$D_l(t, k) = \sum_{i=-(n-1)/2}^{(n-1)/2} \frac{D_L(t, k + ik_0)}{n},$$

where $D_l(t, k)$ is seismic wavefield in channel number/discretized spatial domain as a function of time t and channel index k with gauge length l, L is the first gauge length, $D_L(t, k+ik_0)$ is the first seismic wavefield in the wavenumber domain as a function of time and channel index k with gauge length L, n is the positive integer, and i is a summation index that is an integer if n is odd and is a half integer if n is even, $k=x/\Delta d$ is a channel index with $\Delta d$ being a spatial sampling interval such that x and L are divisible by $\Delta d$, and $k_0=L/\Delta d$.

A system 1 can comprise: an optical fiber disposed in a wellbore and arranged such that the optical fiber is operatively subjected to seismic waves; an optical source arranged to operatively couple an optical signal into the optical fiber; an having an optical receiver arranged to operatively receive optical responses from the optical fiber in response to backscattered optical signal from the optical fiber; a processor arranged to: process the optical responses acquired from interrogation of the optical fiber, to provide a plurality of wavefields including at least one wavefield being recorded using a gauge length different from gauge lengths of other recorded wavefields of the plurality; and generate a seismic wavefield free of gauge length effect and/or generate a prediction of a seismic wavefield of arbitrary gauge length, based on attenuation factors of the plurality of wavefields and application of a low pass filter in wavenumber domain, the low pass filter having a cut-off wavenumber, the cut-off wavenumber being less than or equal to one divided by the greatest common divisor of the gauge lengths of the plurality of wavefields.

A system 2 can include elements of system 1 and can include the greatest common divisor being less than or equal to a lower limit of phase velocity of the seismic waves divided by an upper frequency of the seismic waves.

A system 3 can include elements of any of systems 1 and 2 and can include a lower limit of the gauge lengths being restrained by hardware design.

A system 4 can include elements of any of systems 1-3 and can include the attenuation factors of the wavefields of different gauge lengths having substantially evenly distributed zeros.

A system 5 can include elements of system 4 and elements of any of systems 1-3 and can include the different gauge lengths being selected according to $L_k=2^n \cdot 3^m \cdot L_{desired}$, where $L_k$ is the kth gauge length, m and n are non-negative integers, $|m-n| \leq 2$, $L_k$ is greater than or equal to a gauge length corresponding to hardware, and $L_{desired}$ is greatest common divisor for the different gauge lengths.

A system 6 can include elements of any of systems 1-5 and can include the processor arranged to generate the seismic wavefield free of gauge length effect to include the processor arranged to process, in the wavenumber domain, the attenuation factors, the plurality of wavefields, and the application of the low pass filter in accordance with $$\tilde{d}(t, k) = \tilde{f}_{k_{uplim}}(k) \cdot \frac{\Sigma_{\{l\}} sgn(A(k, l)) * \tilde{D}_l(t, k)}{\Sigma_{\{l\}} |A(k, l)|},$$

where $\tilde{d}(t, k)$ is a one dimensional Fourier transform of d(t, x) along the space direction (x axis) with d(t, x) being the seismic wavefield free of gauge length effect in a spatial domain with respect to time t and distance x, $\tilde{D}_f(t, k)$ is the Fourier transform of $D_f(t, x)$ with $D_f(t, x)$ being a seismic wavefield of gauge length l in spatial domain, sgn(•) is the sign function, and |•| is an absolute value operator, $\Sigma_{\{l\}}$ is a summation over the different gauge lengths, $\tilde{f}_{k_{uplim}}(k)$ is the low pass filter in wavenumber domain, and A(k, l) is the attenuation factor of gauge length l in wavenumber domain with $$A(k, l) = sinc(kl)$$

where $$sinc(kl) = \frac{\sin(\pi kl)}{\pi kl},$$

k is the wavenumber, and l is the gauge length.

A system 7 can include elements of any of systems 1-6 and can include the processor arranged to predict the seismic wavefield of arbitrary gauge length to include the processor arranged to process, in the wavenumber domain, the attenuation factors, the plurality of wavefields and the application of the low pass filter in accordance with $$\tilde{D}_L(t, k) = \tilde{f}_{k_{uplim}}(k) \cdot A(k, L) \cdot \frac{\Sigma_{\{l\}} sgn(A(k, l)) * \tilde{D}_l(t, k)}{\Sigma_{\{l\}} |A(k, l)|},$$

where L is the arbitrary gauge length for the wavefield being generated, $\tilde{D}_L(t, k)$ is the Fourier transform of $D_L(t, x)$ with $D_L(t, x)$ being a seismic wavefield of gauge length L in spatial domain with respect to time t and distance x, sgn(•) is the sign function, |•| is an absolute value operator, $\Sigma_{\{l\}}$ is a summation over the different gauge lengths, $\tilde{f}_{k_{uplim}}(k)$ is the low pass filter in wavenumber domain, and A(k, L) is the attenuation factor of gauge length L in wavenumber domain with $$A(k, l) = sinc(kl)$$

where $$sinc(k, l) = \frac{\sin(\pi kl)}{\pi kl},$$

k is the wavenumber, and l is the gauge length.

A system 8 can comprise: an optical fiber disposed in a wellbore and arranged such that the optical fiber is operatively subjected to seismic waves; an optical source arranged to operatively couple an optical signal into the optical fiber; an interrogator having an optical receiver arranged to operatively receive optical responses from the optical fiber in response to backscattered optical signal from the optical fiber; a processor arranged to: process optical responses acquired from interrogation of the optical fiber, the processing to provide a first seismic wavefield with a first gauge length applied; and convert the first seismic wavefield to a seismic wavefield with a different gauge length, the different gauge length being a positive integer multiple of the first gauge length.

A system 9 can include elements of system 8 and can include the processor arranged to convert the first seismic wavefield to include the processor arranged to generate a moving average of the first seismic wavefield.

A system 10 can include elements of systems 8 and 9 and can include the processor arranged to convert the first seismic wavefield to include the processor arranged to process, in the spatial domain, in accordance with $$D_l(t, x) = \sum_{i=-(n-1)/2}^{(n-1)/2} \frac{D_L(t, x + iL)}{n},$$

where $D_l(t, x)$ is seismic wavefield in the spatial domain as a function of time t and distance x with gauge length l, L is the first gauge length, $D_L(t, x+iL)$ is the first seismic wavefield in the spatial domain as a function of time t, distance x, and the first gauge length, n is the positive integer, and i is a summation index that is an integer if n is odd and is a half integer if n is even.

A system 11 can include elements of systems 8-10 and can include the processor arranged to convert the first seismic wavefield to include the processor arranged to process, in the channel number/discretized spatial domain, in accordance with $$D_l(t, k) = \sum_{i=-(n-1)/2}^{(n-1)/2} \frac{D_L(t, k + ik_0)}{n},$$

where $D_l(t, k)$ is seismic wavefield in channel number/discretized spatial domain as a function of time t and channel index k with gauge length l, L is the first gauge length, $D_L(t, k+ik_0)$ is the first seismic wavefield in the wavenumber domain as a function of time and channel index k with gauge length L, n is the positive integer, and i is a summation index that is an integer if n is odd and is a half integer if n is even, k=x/Δd is a channel index with Δd being a spatial sampling interval such that x and L are divisible by Δd, and $k_0$=L/Δd.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
    interrogating an optical fiber disposed in a wellbore with an optical signal, the optical fiber subjected to seismic waves;
    processing signals acquired from interrogating the optical fiber, providing a first seismic wavefield with a first gauge length applied; and
    converting the first seismic wavefield to a seismic wavefield with a different gauge length, the different gauge length being a positive integer multiple of the first gauge length.

2. The method of claim 1, wherein converting the first seismic wavefield includes generating a moving average of the first seismic wavefield.

3. The method of claim 1, wherein converting the first seismic wavefield to the seismic wavefield with the different gauge length includes processing, in the spatial domain, in accordance with $$D_l(t, x) = \sum_{i=-(n-1)/2}^{(n-1)/2} \frac{D_L(t, x + iL)}{n},$$

where $D_l(t, x)$ is seismic wavefield in the spatial domain as a function of time t and distance x with gauge length l, L is the first gauge length, $D_L(t, x+iL)$ is the first seismic wavefield in the spatial domain as a function of time i, distance x, and the first gauge length, n is the positive integer, and i is a summation index that is an integer if n is odd and is a half integer if n is even.

4. The method of claim 1, wherein converting the first seismic wavefield to the seismic wavefield with the different gauge length includes processing, in the channel number/discretized spatial domain, in accordance with $$D_l(t, k) = \sum_{i=-(n-1)/2}^{(n-1)/2} \frac{D_L(t, k + ik_0)}{n},$$

where $D_l(t, k)$ is seismic wavefield in channel number/discretized spatial domain as a function of time t and channel index k with gauge length l, L is the first gauge length, $D_L(t, k+ik_0)$ is the first seismic wavefield in the wavenumber domain as a function of time and channel index k with gauge length L, n is the positive integer, and i is a summation index that is an integer if n is odd and is a half integer if n is even, $k=x/\Delta d$ is a channel index with $\Delta d$ being a spatial sampling interval such that x and L are divisible by $\Delta d$, and $k_0=L/\Delta d$.

5. A machine-readable storage device having instructions stored thereon, which, when executed by control circuitry of a machine, cause the machine to perform operations, the operations comprising the method of claim 1.

6. A system comprising:
  an optical fiber disposed in a wellbore and arranged such that the optical fiber is operatively subjected to seismic waves;
  an optical source arranged to operatively couple an optical signal into the optical fiber;
  an interrogator having an optical receiver arranged to operatively receive optical responses from the optical fiber in response to backscattered optical signal from the optical fiber;
  a processor arranged to:
    process optical responses acquired from interrogation of the optical fiber, the processing to provide a first seismic wavefield with a first gauge length applied; and
    convert the first seismic wavefield to a seismic wavefield with a different gauge length, the different gauge length being a positive integer multiple of the first gauge length.

7. The system of claim 6, wherein the processor arranged to convert the first seismic wavefield includes the processor arranged to generate a moving average of the first seismic wavefield.

8. The system of claim 6, wherein the processor arranged to convert the first seismic wavefield includes the processor arranged to process, in the spatial domain, in accordance with $$D_l(t, x) = \sum_{i=-(n-1)/2}^{(n-1)/2} \frac{D_L(t, x + iL)}{n},$$

where $D_l(t, x)$ is seismic wavefield in the spatial domain as a function of time t and distance x with gauge length l, L is the first gauge length, $D_L(t, x+iL)$ is the first seismic wavefield in the spatial domain as a function of time t, distance x, and the first gauge length, n is the positive integer, and i is a summation index that is an integer if n is odd and is a half integer if n is even.

9. The system of claim 6, wherein the processor arranged to convert the first seismic wavefield includes the processor arranged to process, in the channel number/discretized spatial domain, in accordance with $$D_l(t, k) = \sum_{i=-(n-1)/2}^{(n-1)/2} \frac{D_L(t, k + ik_0)}{n},$$

where $D_l(t, k)$ is seismic wavefield in channel number/discretized spatial domain as a function of time t and channel index k with gauge length l, L is the first gauge length, $D_L(t, k+ik_0)$ is the first seismic wavefield in the wavenumber domain as a function of time and channel index k with gauge length L, n is the positive integer, and i is a summation index that is an integer if n is odd and is a half integer if n is even, $k=x/\Delta d$ is a channel index with $\Delta d$ being a spatial sampling interval such that x and L are divisible by $\Delta d$, and $k_0=L/\Delta d$.

* * * * *